(12) United States Patent
Tsang et al.

(10) Patent No.: US 8,913,099 B2
(45) Date of Patent: Dec. 16, 2014

(54) SYSTEMS AND METHODS TO MANAGE VIDEO CHAT CONTACTS

(75) Inventors: Thomas Calum Tsang, Toronto (CA); Boris Rozinov, Richmond Hill (CA); Matthew David Douglas Williams, Burlington (CA)

(73) Assignee: Blackberry Limited, Waterloo (CA)

( * ) Notice: Subject to any disclaimer, the term of this patent is extended or adjusted under 35 U.S.C. 154(b) by 198 days.

(21) Appl. No.: 13/462,788

(22) Filed: May 2, 2012

(65) Prior Publication Data

US 2013/0293664 A1 Nov. 7, 2013

(51) Int. Cl.
*H04N 7/14* (2006.01)
(52) U.S. Cl.
CPC .................................. *H04N 7/141* (2013.01)
USPC ...................................................... 348/14.01
(58) Field of Classification Search
CPC  H04L 12/1813; H04L 12/1827; H04N 7/141; H04N 21/4788
USPC ........... 348/14.08, 14.09, 14.02, 14.01, 14.03
See application file for complete search history.

(56) References Cited

U.S. PATENT DOCUMENTS

| 6,973,299 | B2 | 12/2005 | Apfel | |
|---|---|---|---|---|
| 2009/0262668 | A1* | 10/2009 | Hemar et al. | 370/260 |
| 2010/0144325 | A1* | 6/2010 | Roundtree et al. | 455/414.1 |

FOREIGN PATENT DOCUMENTS

| WO | 0229513 | 4/2002 |
|---|---|---|
| WO | 2008027955 | 3/2008 |

OTHER PUBLICATIONS

"How to add contacts to Skype accounts"; Apr. 10, 2012; http://www.5icall.net/2012/04/10/add-contacts-skype-accounts/.
"How do I make a FaceTime call on my iPhone 4?"; Online at least as early as Nov. 4, 2010; http://www.askdavetaylor.com/how_to_make_facetime_call_iphone_4.html.
Alshammari, R. et al.; "Insight into the Gtalk Protocol"; Mar. 8, 2012; https://www.cs.dal.ca/sites/default/files/technical_reports/CS-2010-02.pdf.
Michaluk, K.; First Look: Updated Video Chat Client on Blackberry Playbook OS 2.0! | CrackBerry.com; Jan. 13, 2012; http://crackberry.com/first-look-updated-video-chat-client-blackberry-playbook-os-20.

* cited by examiner

*Primary Examiner* — Stella Woo
(74) *Attorney, Agent, or Firm* — Blake, Cassels & Graydon LLP; Wilfred P. So; Brett J. Slaney

(57) ABSTRACT

Systems and methods are provided to automatically discover if an email address contact is video chat capable. A server receives a request from an electronic device to determine video chat capability associated with an email address. It compares the email address with a listing of email addresses, wherein the listing includes email addresses associated with other electronic devices having video chat capability. If an entry in the listing matches the email address, it returns a message configured to automatically enable addition of the email address as a video chat contact on the electronic device.

41 Claims, 21 Drawing Sheets

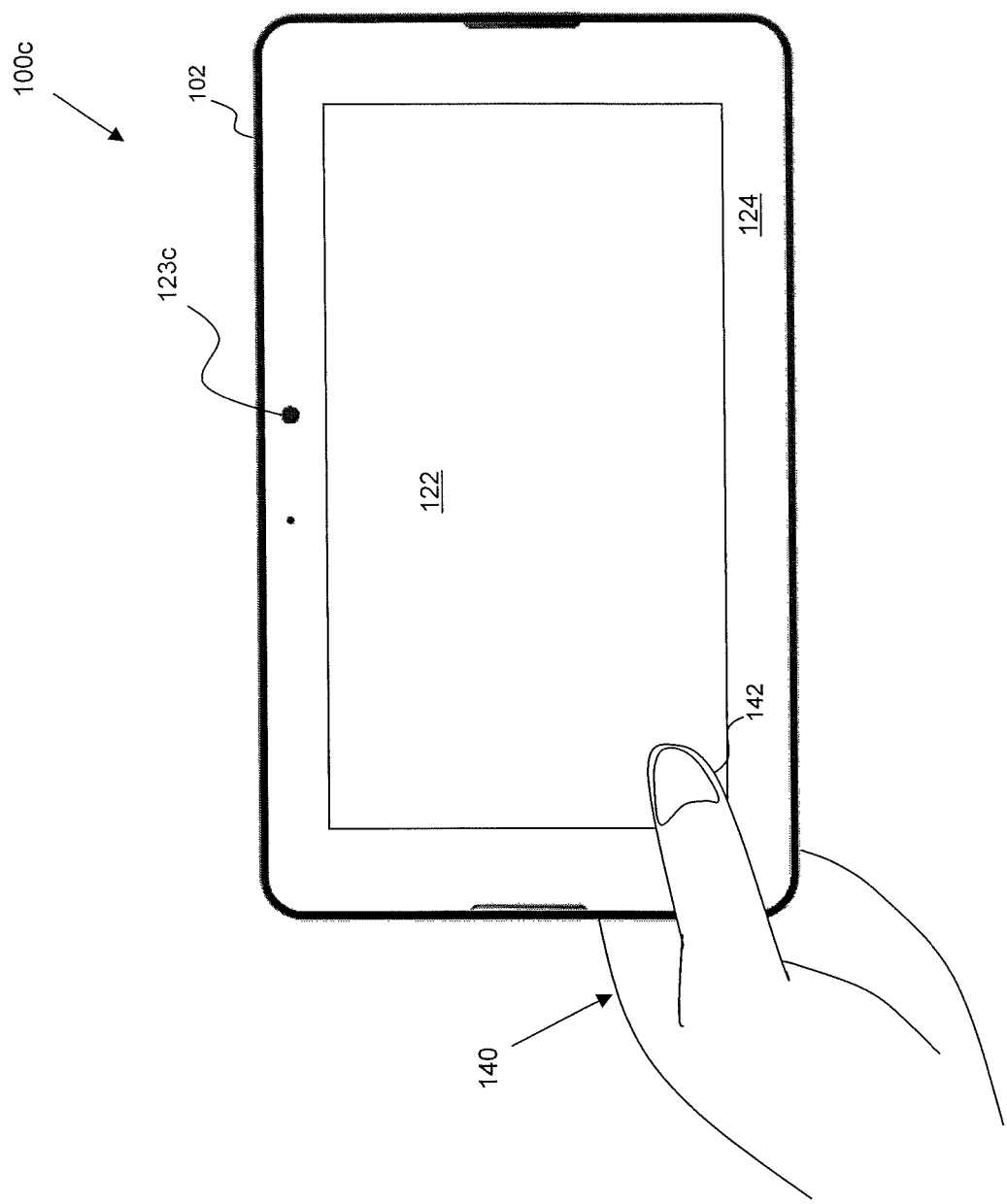

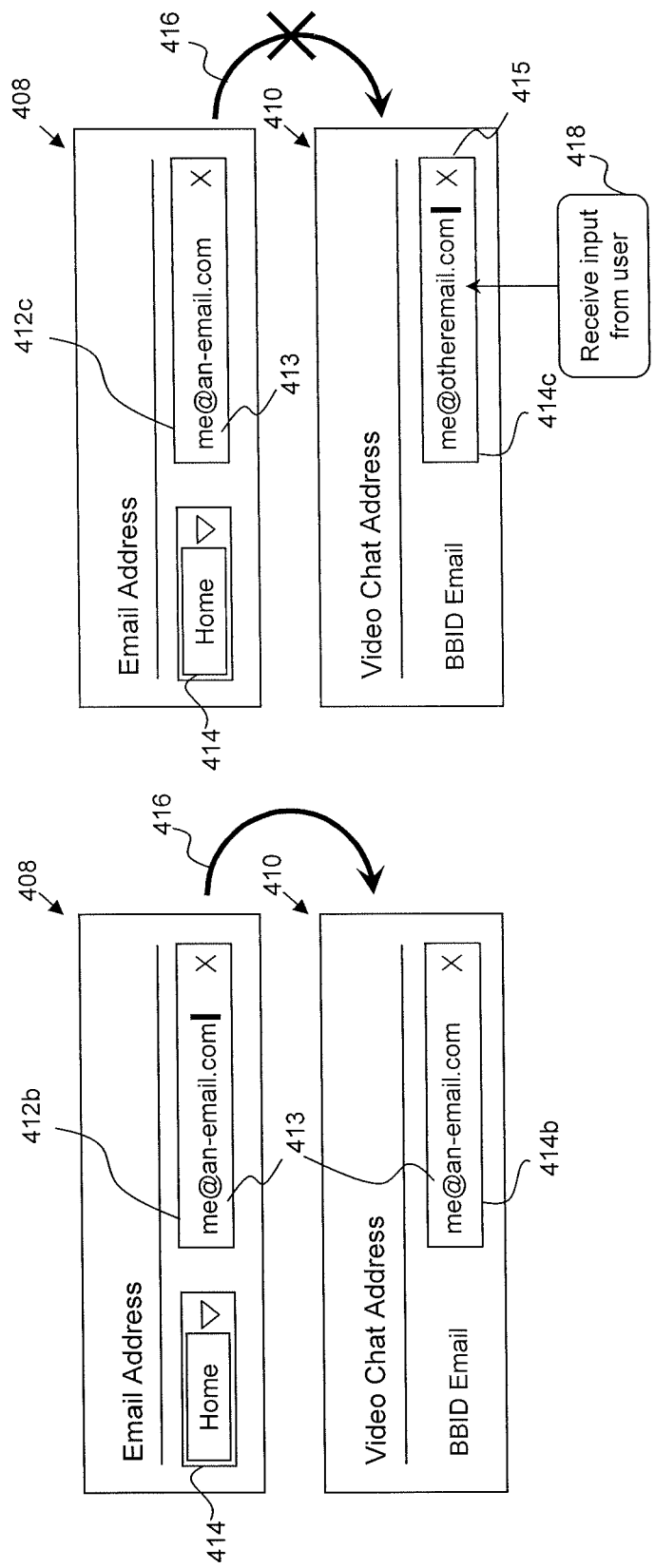

SYSTEMS AND METHODS TO MANAGE VIDEO CHAT CONTACTS

TECHNICAL FIELD

The following relates generally to managing video chat contacts.

DESCRIPTION OF THE RELATED ART

Many electronic devices, including mobile devices, include a camera used to capture the face of the user of the device. The camera enables the devices to be used to extend the mobile chatting experience to include real-time video. For example, a first mobile device can initiate a video chatting session with a second mobile device. The face of a first user is captured by camera of the first device and broadcasted in real-time to the display screen of the second mobile device. Similarly, the face of a second user is captured by the camera of the second device and broadcasted in real-time to the display screen of the first mobile device.

BRIEF DESCRIPTION OF THE DRAWINGS

Example embodiments will now be described by way of example only with reference to the appended drawings wherein:

FIG. 4 is a plan view of another example embodiment mobile device.

FIG. 10 is the email address and video chat address portions of FIG. 9, wherein the video chat address field is automatically populated, according to an example embodiment.

FIG. 11 is the email address and video chat address portions of FIG. 9, wherein the video chat address field is entered by a user, according to an example embodiment.

DETAILED DESCRIPTION

Figure 1:
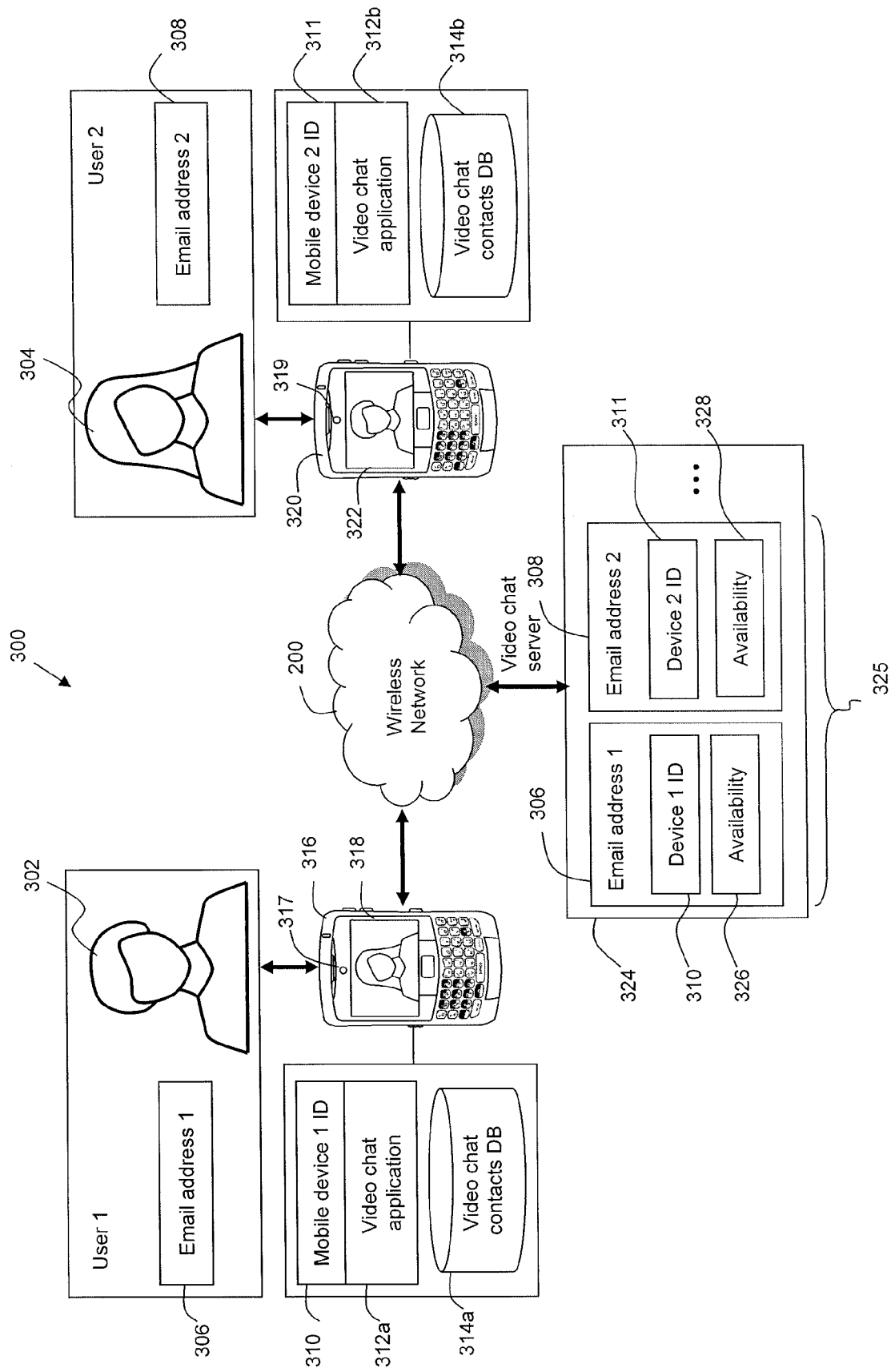
FIG. 1 is a block diagram of an example embodiment of a video chat system.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A mobile device may include one or more cameras for capturing video or pictures. The camera or cameras may be positioned on a front face of the mobile device to capture the face of a user of the mobile device. A mobile device may also include software applications which enable video content captured by the one or more cameras of the mobile device to be transmitted to one or more other mobile devices. The combination of the hardware and software components as described enables a mobile device to offer video chatting services.

For a mobile device to engage in video chatting, the mobile device must be capable of video chatting. Video chat capability is defined as the ability for a mobile device to engage in video chatting based on the fulfillment of certain hardware and software requirements. In an example embodiment, a mobile device requires a camera in order to engage in video chatting. In another example embodiment, a mobile device requires a video chat application in order to engage in video chatting. Other conditions related to hardware and software can be used in addition to, or instead of, these example requirements.

In an example embodiment, both hardware and software requirements must be met in order for the mobile device to be considered video chat capable. For example, a mobile device having a camera but not a video chat application cannot engage in video chatting and is therefore not video chat capable. Similarly, a mobile device having a video chat application but not a camera cannot engage in video chatting and is therefore not video chat capable.

It is useful for a mobile device to be able to determine the discoverability of other mobile devices. A mobile device is defined as discoverable to video chat service, or just discoverable, if the mobile device is video chat capable and the user of the mobile device has subscribed to a video chat service. Subscription to a video chat service can be obtained, for example, when the user of the mobile device agrees to an End-Use License Agreement (EULA). A mobile device is defined as not discoverable if the mobile device is not video chat capable, or has not subscribed to a video chat service, or both. A mobile device having video chat capability may not necessarily be discoverable to other mobile devices. For example, a user of a mobile device having video chat capability may choose not to subscribe to a video chat service. For example, a user of a mobile device having video chat capability may have chosen to reject an EULA. Since the user in this case, chose not to subscribe, such a mobile device is not discoverable.

It can be appreciated that a user is often unaware whether a contact has video chat capability. In some example video chat systems, a user attempts to initiate a video chat session with a contact without knowing whether or not the contact is video chat capable. This "blind" video chat initiation can be frustrating and leaves a user unsure about being able to communicate with a contact via video chat. It is therefore useful to determine if a contact has video chat capability.

After determining that a mobile device is discoverable to video chat service, it is also useful to determine an availability of the mobile device. By definition, a mobile device is available if a user of the mobile device is physically able or willing to engage in one or more chatting sessions in substantially real-time and at the present time. A chatting session can include a video chatting session or an instant messaging chat session. For example, a mobile device may be available if the mobile device is within coverage of the cellular service provider and the user of the mobile device has set his "availability status" as "available". For example, a mobile device may be unavailable if the mobile device is out of coverage of the cellular service provider or the user of the mobile device has set his "availability status" as "busy". The availability status may be, for example, a user-selectable feature provided by a video chat application or an instant messaging application. A mobile device that is discoverable is not necessarily available.

Availability may be device-level or application-level. Device-level availability is an attribute shared by a plurality of applications. For example, a user may set his mobile device to "busy" in a systems setting menu, and this availability status will be reflected in all applications utilizing availability status, e.g. video chat application and instant messaging application. Application-level availability is applied at the level of an application. For example, a user may set his video chat service availability status to "busy" but at the same time set his instant messaging availability status to "available". It can be appreciated that the methods described herein may apply to both device-level availability and application-level availability.

Figure 28:
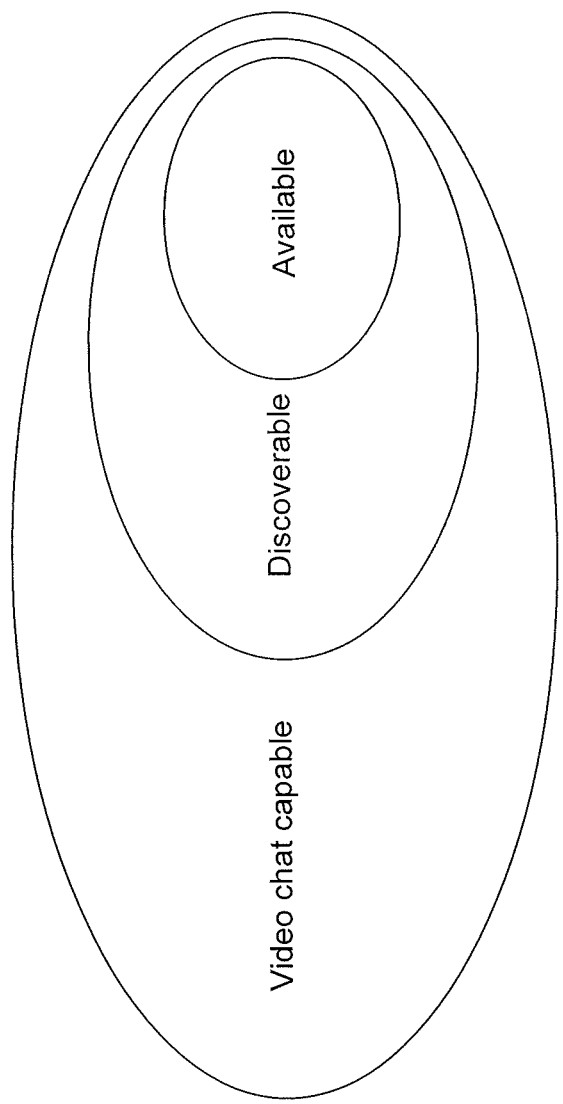
FIG. 28 is an illustration of the relationship between the definitions of video chat capability, discoverability, and availability.

The relationship between video chat capability, discoverability, and availability, is illustrated in terms of subsets in FIG. 28.

The systems and method described herein address issues related to discoverability of video chat contacts.

An example embodiment of a video chat system will now be described with reference to FIG. 1.

Turning now to FIG. 1, a block diagram of an example embodiment of a video chat system 300 is shown. In the example embodiment, a first user 302 of a first mobile device 316 is engaging in a video chat session with a second user 304 of a second mobile device 308. The first user 302 is uniquely identified by a first email address 306. The second user 304 is uniquely identified by a second email address 308. The first mobile device 316 is uniquely identified by a first mobile device ID 310. The second mobile device 320 is uniquely identified by a second mobile device ID 311. The mobile device ID's can, for example, be a serial number provided by the manufacturer which is unique to a mobile device.

In the example embodiment, both mobile devices 316, 320 include a video chat application 312, a video chat contacts database 314 and a camera 317, 319. In the example embodiment, the camera 317, 319 is a front facing camera. It can be appreciated that the camera can also be a back-facing camera or a USB camera operable using the mobile device 316, 320. The video chat database 314 includes a listing of email addresses associated with mobile devices that are discoverable.

In the example embodiment, both mobile devices 316, 320 have been determined to be discoverable based on systems and methods to be described in FIGS. 8 to 25.

In the example embodiment, the video chat application 312a of the first mobile device 316 captures video content using the camera 317 of the first mobile device 316. The video content is transmitted through a wireless network 200 and is received by the second mobile device 320. The video chat application 312b of the second mobile device 320 receives the video content from the first mobile device 316 and displays the video content on a display screen 322 of the second mobile device 320. In an example embodiment, the transmission of the video content from the camera 317 of the first mobile device 316 to the display screen 322 of the second mobile device 320 occurs in substantially real-time. In the example embodiment, the video content transmitted from the first mobile device 316 to the second mobile device 320 includes the face of the first user.

In the example embodiment, the video chat application 312b of the second mobile device 320 also captures video content using the camera 319 of the second mobile device 320. The video content is transmitted through a wireless network 200 and is received by the first mobile device 316. The video chat application 312a of the first mobile device 316 receives the video content from the second mobile device 320 and displays the video content on a display screen 318 of the first mobile device 316. The transmission of the video content from the camera 319 of the second mobile device 320 to the display screen 318 of the first mobile device 316 occurs in substantially real-time. In the example embodiment, the video content transmitted from the second mobile device 320 to the first mobile device 316 includes the face of the second user.

In the example embodiment, a video chat server 324 is provided. The video chat server 324 provides a registrar which stores a listing 325 of email addresses associated with mobile devices that are discoverable. In an example embodiment, the registrar is a Session Initiation Protocol (SIP) registrar. Systems and methods for providing the listing 325 of email addresses will be discussed later with reference to FIGS. 8 to 18.

It can be appreciated that the video chat server 324 can include a plurality of servers in different geographical locations. In an example embodiment, the server 324 is dedicated to video chat information, and only stores information related to the video chat contacts. In another example embodiment, server 324 additionally stores other information.

The methods and systems described herein can be implemented with respect to the example embodiment video chat system of FIG. 1, wherein a first mobile device engages in a video chat session with a second mobile device. It can be appreciated, however, that a video chat session can be conducted using more than two mobile devices. For example, three or more mobile devices can engage in a video chat conference wherein each mobile device can transmit video content to two or more other mobile devices in substantially-real time.

It can also be appreciated that although an email address serves to uniquely identify a user of a mobile device in the example embodiment of FIG. 1, other methods for uniquely identifying a use of a mobile device are possible. For example, the unique identifier can be the mobile device ID 310, which can include a randomly-generated alphanumeric string. In other examples, for the sake of clarity, the methods and systems described herein will refer to the email address as being the unique identifier, with the understanding that in other example embodiments, other identifiers can substitute the role of the email address to uniquely identify the user of a mobile device.

Example embodiments of mobile devices will now be described with reference to FIGS. 2 to 7.

It can be appreciated that various mobile devices can be used with the example embodiments described herein. Examples of applicable electronic devices include pagers, tablets, cellular phones, cellular smart-phones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the example embodiments described herein are also suitable for other devices, e.g. "non-mobile" devices. The non-mobile devices may include, for example, a desktop computer. More generally, both non-mobile and mobile devices are referred to as "electronic devices". Such terms can be interchangeable.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 3:
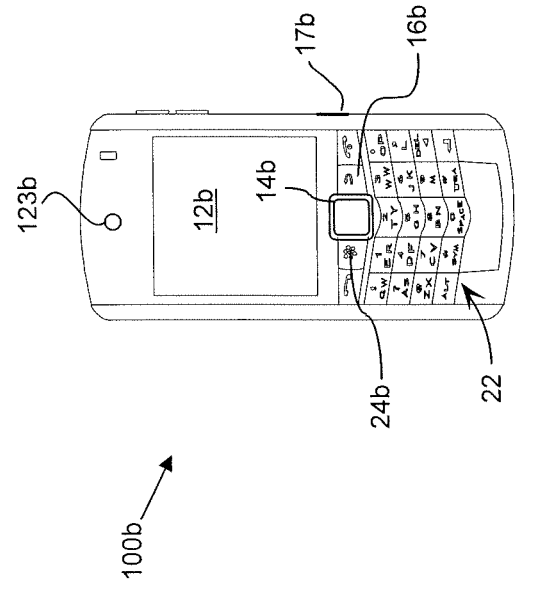
FIG. 3 is a plan view of another example embodiment mobile device.
Figure 2:
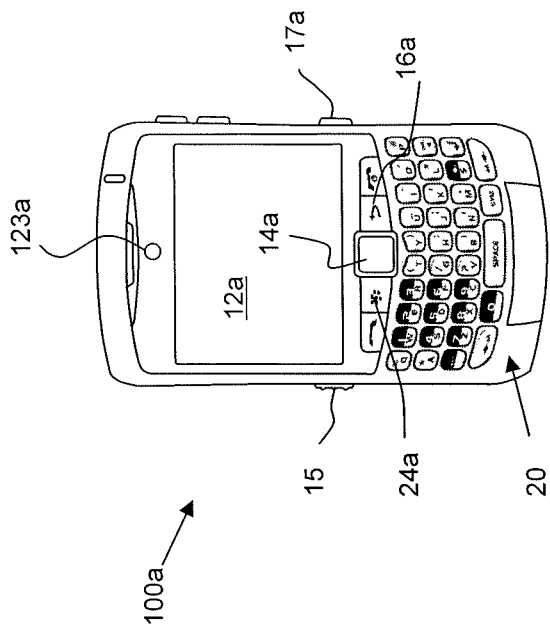
FIG. 2 is a plan view of an example embodiment mobile device.

Referring to FIGS. 2, 3 and 4, any of mobile devices 100a, 100b and 100c may be used to implement the example embodiments disclosed herein. It will be appreciated that the numeral "100" will hereinafter refer to any mobile device 100, including the example embodiments 100a, 100b and 100c, those example embodiments enumerated above or otherwise.

It will also be appreciated that for FIGS. 2 and 3, a similar numbering convention may be used for other general features common between FIGS. 2 and 3, such as a display 12, a positioning device 14, a cancel or escape button 16, a camera 123, a camera button 17, and a menu or option button 24.

The mobile device 100a shown in FIG. 2 includes a display 12a, a cursor or view positioning device 14, and a camera 123a. Shown in this example embodiment are a front-facing camera 123a and an optical track pad 14a. In another example embodiment, the positioning device 14 is a track ball (not shown). In yet another example embodiment, the camera 123a is a back-facing camera (not shown). Positioning device 14 may serve as another input member and detects the displacement of a finger that is moving on top of it to provide selection inputs to the main processor 102 (see FIG. 5). It can also be pressed in a direction generally toward housing to provide another selection input to the processor 102. The optical track pad 14a permits multi-directional positioning of the selection cursor 18 (see FIG. 6) such that the selection cursor 18 can be moved in an upward direction, in a downward direction and, if desired and/or permitted, in any diagonal direction. The optical track pad 14a is in this example situated on the front face of a housing for mobile device 100a as shown in FIG. 2 to enable a user to manoeuvre the optical track pad 14a while holding the mobile device 100a in one hand. The optical track pad 14a may serve as another input member (in addition to a directional or positioning member) to provide selection inputs to the processor 102 and can preferably be pressed in a direction towards the housing of the mobile device 100b to provide such a selection input.

The display 12a may include a selection cursor 18 that depicts generally where the next input or selection will be received. The selection cursor 18 may include a box, alteration of an icon or any combination of features that enable the user to identify the currently chosen icon or item. The mobile device 100a in FIG. 2 also includes a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

The mobile device 100b shown in FIG. 3 includes a display 12b, a camera 123b, and a cursor or view positioning device 14b. Shown in this example embodiment is a front-facing camera 123b and an optical track pad 14b. In another example embodiment, the positioning device 14b is a track ball (not shown). In yet another example embodiment, the camera 123b is a back-facing camera (not shown). The mobile device 100b also includes a menu or option button 24b, a cancel or escape button 16b, and a camera button 17b. The mobile device 100b as illustrated in FIG. 3 includes a reduced QWERTY keyboard 22. In this example embodiment, the keyboard 22, positioning device 14b, escape button 16b and menu button 24b are disposed on a front face of a mobile device housing. The reduced QWERTY keyboard 22 includes a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 2 and 3 are for illustrative purposes only and various other mobile devices 100 are equally applicable to the following examples. For example, other mobile devices 100 may include the trackball 14b, escape button 16b and menu or option button 24 similar to that shown in FIG. 3 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

The mobile device 100c shown in FIG. 4 includes a touch-sensitive display 102 and a front-facing camera 123. The touch-sensitive display 102 includes a touch-sensitive non-display area 124 surrounding a touch-sensitive display area 122, both of which may be capable of receiving inputs in the form of touch inputs. The front-facing camera 123 points towards the user of the mobile device 100c. Although not shown in FIG. 4, it can be appreciated that the mobile device 100c may also have a back-facing camera.

It can be appreciated that the devices shown in FIGS. 2 to 4 can have both a front-facing camera 123 and a back-facing camera.

To aid the reader in understanding the structure of the mobile device 100, reference will now be made to FIGS. 5 through 7.

Figure 5:
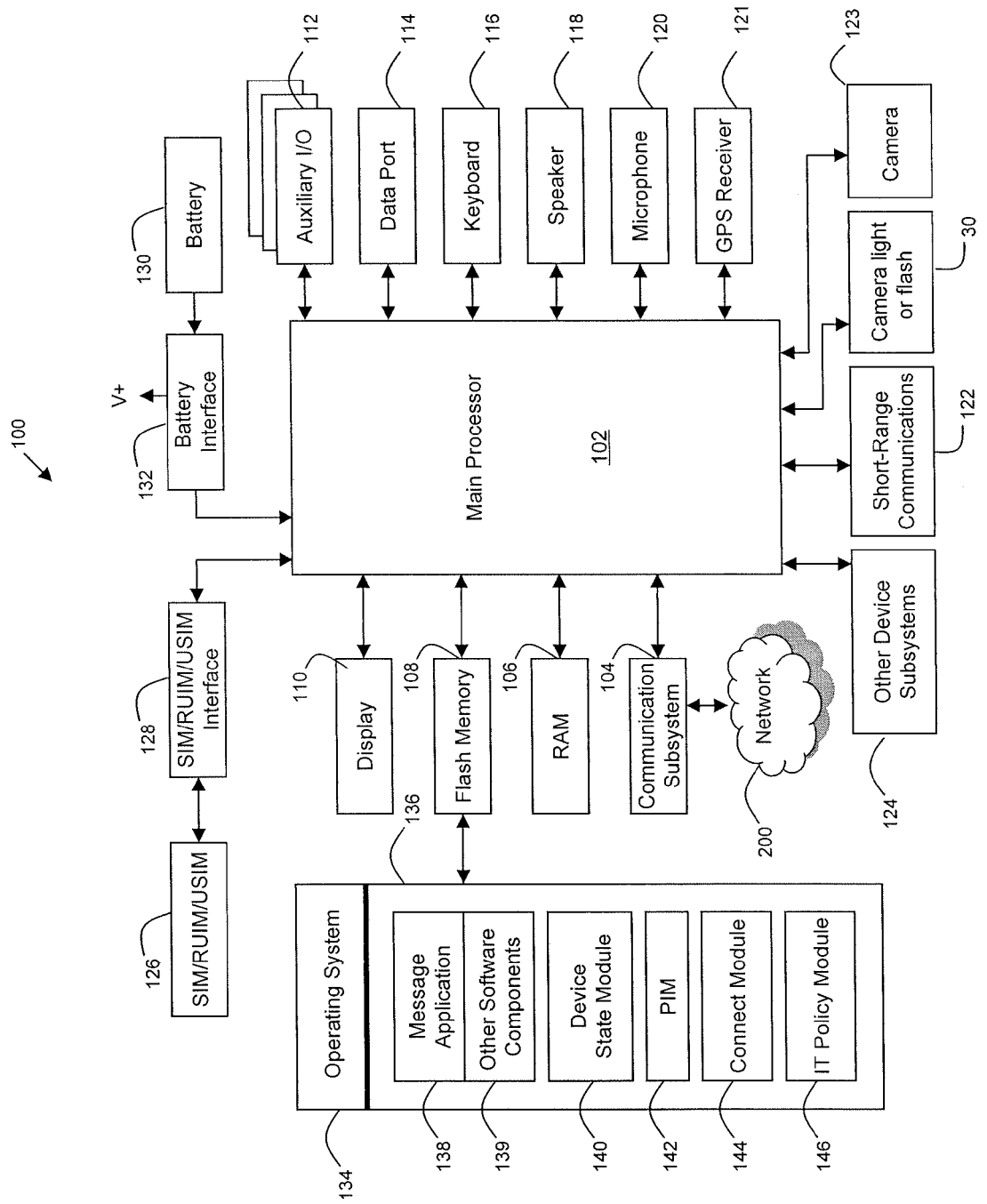
FIG. 5 is a block diagram of an example embodiment mobile device.

Referring first to FIG. 5, shown therein is a block diagram of an example embodiment of a mobile device 100 which may be used to implement the example embodiments disclosed herein. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a camera light or flash 30, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, video chat applications, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The display 110 can also be used in combination with the camera 123 to provide video chatting capability. It can be appreciated that the mobile device 100 may include more than one camera 123. For example, a front-facing camera, a back-facing camera, or both, may be used to engage in a video chaffing session. It can also be appreciated that the camera 123 may be an external hardware component operably connected to the mobile device 100 through the auxiliary I/O 112 or the data port 114.

Figure 6:
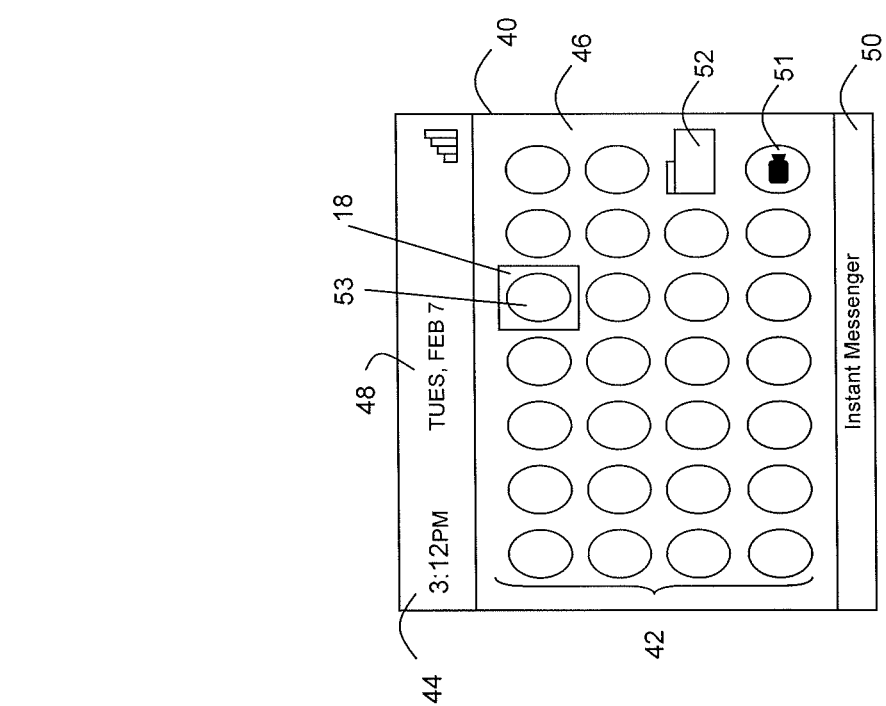
FIG. 6 is a screen shot of a home screen displayed by a mobile device, according to an example embodiment.

Turning now to FIG. 6, the mobile device 100 may display a home screen 40, which can be set as the active screen when the mobile device 100 is powered up and may constitute the main ribbon application. The home screen 40 generally includes a status region 44 and a theme background 46, which provides a graphical background for the display 12. The theme background 46 displays a series of icons 42 in a predefined arrangement on a graphical background. In some themes, the home screen 40 may limit the number of icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. An example icon may be a video chat icon 51 used to indicate a video chat application. One or more of the series of icons 42 is typically a folder 52 that itself is capable of organizing any number of applications therewithin.

The status region 44 in this example embodiment includes a date/time display 48. The theme background 46, in addition to a graphical background and the series of icons 42, also includes a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 6, and providing a selection input, e.g. by pressing the trackball 14*b*.

Figure 7:
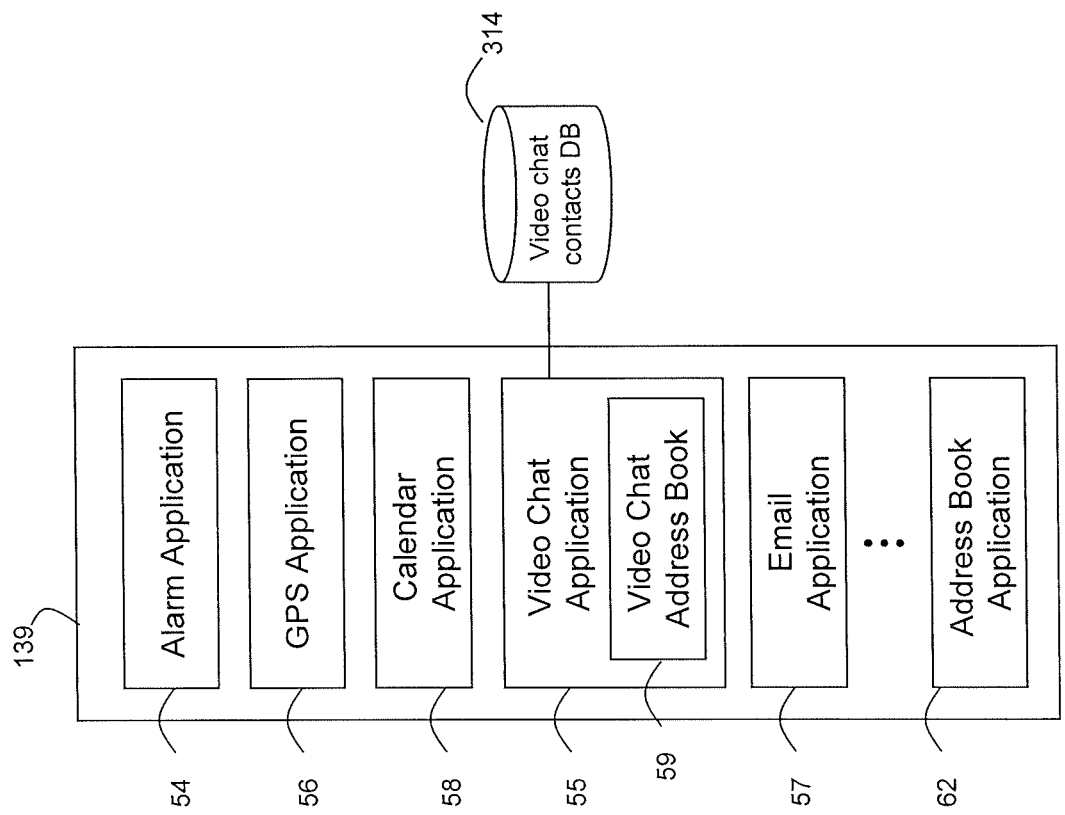
FIG. 7 is a block diagram illustrating example embodiments of the other software applications and components shown in FIG. 5.

FIG. 7 shows an example of the other software applications and components 139 that may be stored and used on the mobile device 100. Only examples are shown in FIG. 7 and such examples are not to be considered exhaustive. In this example, a GPS application 56 may be used to determine the location of a mobile device. A calendar application 58 may be used to organize appointments. Another application shown is an email application 57 that may be used to send and receive emails. Another application shown is an address book 62 that is used to store contact information which may include, for example, an email address, a name, and a phone number.

Another example application is a video chat application 55 that may be used to engage in video chatting sessions. The video chat application 55 may include a video chat contacts database 314. The video chat contacts database 314 stores a listing of email addresses associated with mobile devices that are discoverable. In an example embodiment, the video chat contacts database 314 is stored in flash memory 108 or any other form of non-volatile storage medium. In an example embodiment, the video chat application 55 may provide a video chat address book 59 which provides a listing of only contacts that are discoverable to video chat service.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or accessible or connectable thereto. Any application or module herein described may be implemented using computer readable/executable instructions or operations that may be stored or otherwise held by such computer readable media.

Systems for managing video chat contacts will now be described with reference to FIGS. 8 to 14.

Figures 8, 9:
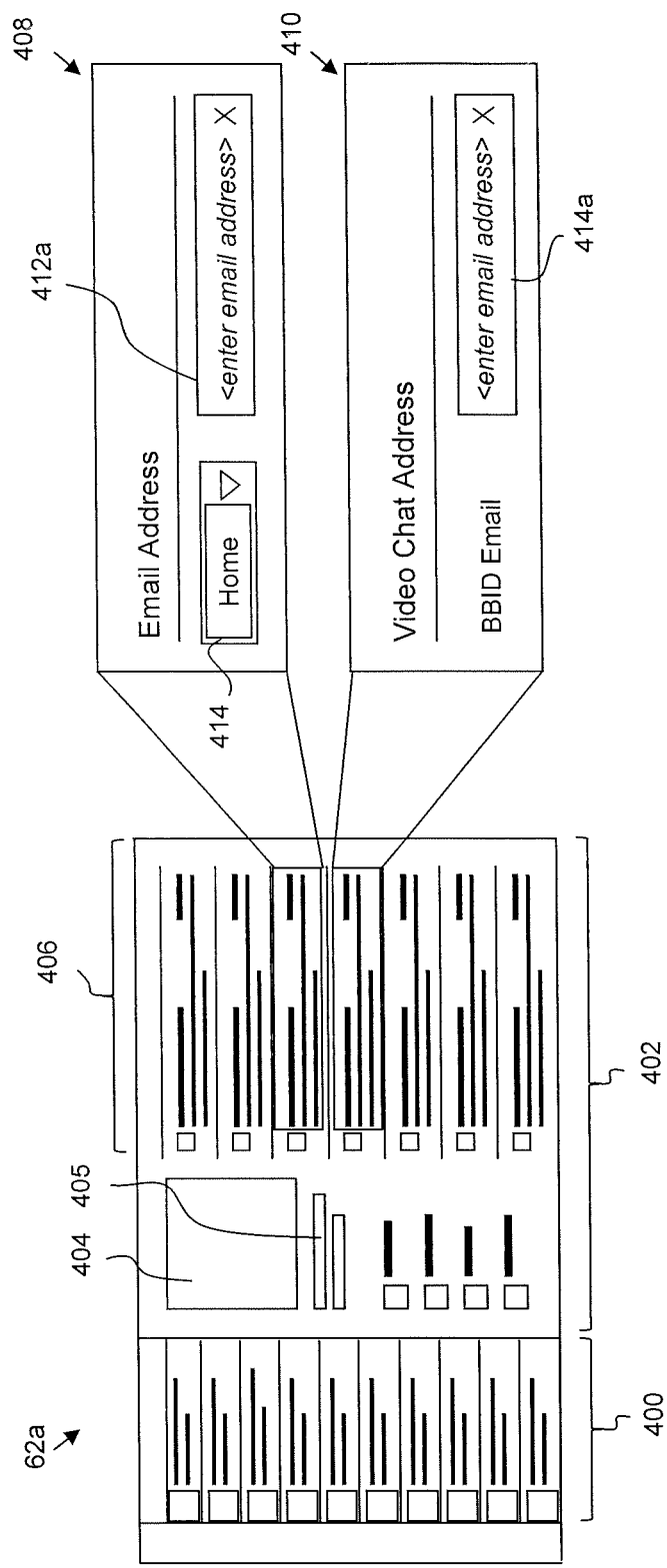
FIG. 8 is a screen shot of an address book application of a first mobile device, according to an example embodiment.
FIG. 9 is the email address and video chat address portions of the address book application of FIG. 8.

Turning now to FIGS. 8 and 9, an example embodiment of an address book application 62a of a first mobile device 316 is shown. The address book application 62a includes a listing of contacts 400 and a contact details section 402. The listing of contacts 400 includes contacts of the first mobile device 316, some of which are discoverable to video chat service and some of which are not. A contact corresponding to a user of a second mobile device 320 may be selected from the listing of contacts 400. Detailed information of the contact corresponding to the user of the second mobile device 320 is then displayed in the contact details section 402. The detailed information can include a display picture 404, a contact name 405, and other contact information 406. Other contact information 406 can include an email address 408, a video chat address 410, a home phone number, a work phone number, a home address, a work address, a telephone number, a mobile device ID, etc. The contact details section 402 serves as a graphical user interface (GUI) 402 for editing the detailed information of a contact corresponding to the user of the second mobile device 320. For example, the user of the first mobile device 31G may edit the display picture 404, the contact name 405, or the email address 408 of the contact corresponding to the second mobile device 320.

Turning now to FIG. 9, example embodiments of the email address 408 and the video chat address 410 portions of the contact details section 402 are shown. It can be appreciated that the email address 408 and the video chat address 410 portions of the address book GUI 402 do not have to be adjacent to each other as shown in FIG. 8. The email address portion 408 includes an email type selector 414 and an email address field 412a. The email type selector 414 can be, for example, a drop-down menu. Examples of email types include "home", "work", "other", etc. The video chat address 410 includes a video chat address field 414a. An email address corresponding to a second mobile device 320 can be inputted in the email address field 408 or in the video chat address field 410.

Figure 18:
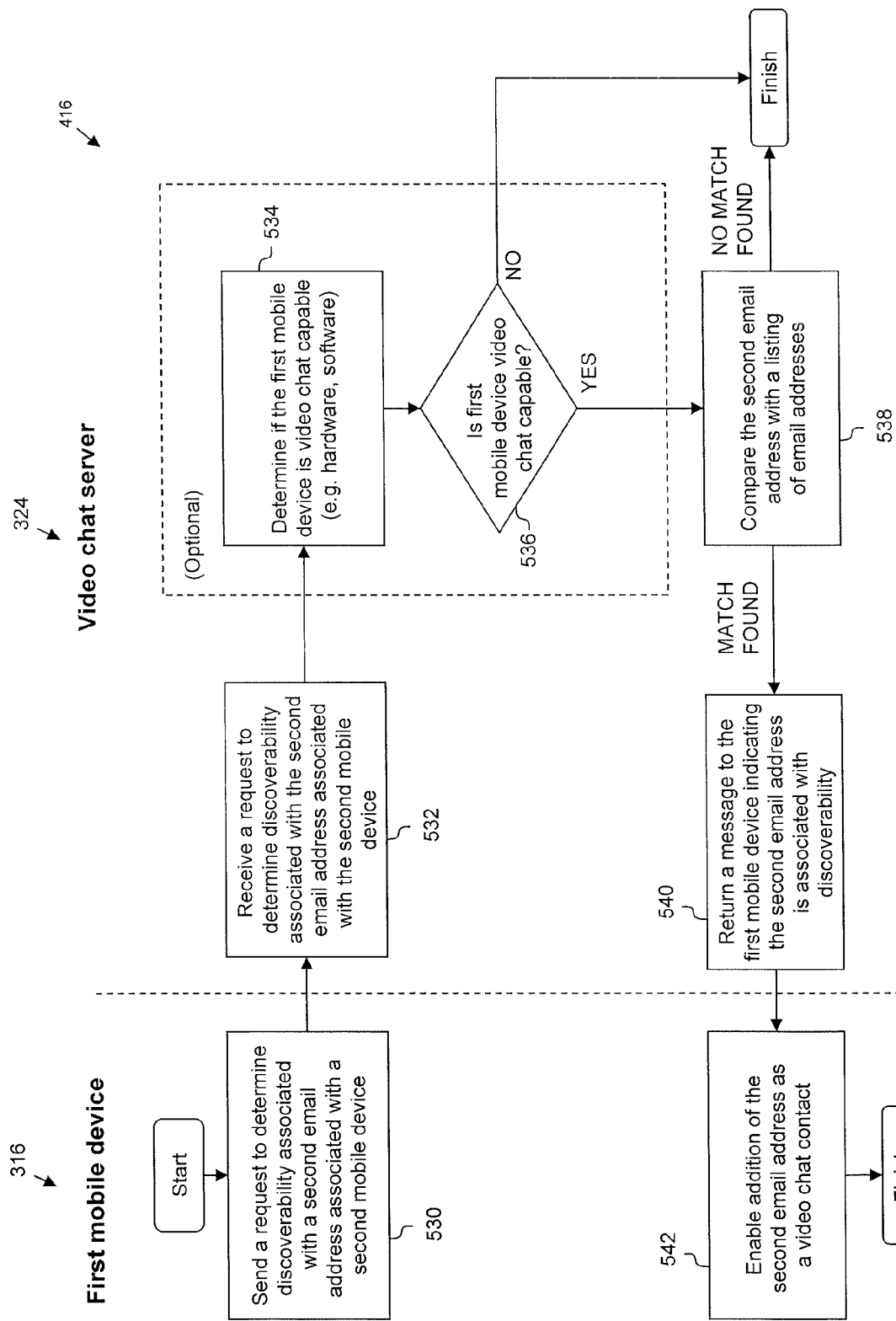
FIG. 18 is a flow diagram of computer executable or processor implemented instructions for determining if a second mobile device is discoverable for video chat, according to an example embodiment.

Turning now to FIG. 10, the email address 408 and video chat address portions 410 of the contact details section 402 are shown, wherein the video chat address field 414b corresponding to the second mobile device 320 is automatically populated, according to an example embodiment. In the example embodiment, an email address 413 of a second mobile device 320 is inputted in the email address field 412b. A discoverability of the second mobile device 320 is determined according to an example embodiment method, symbolically represented by the arrow 416 (FIG. 18). The video chat address field 414b is automatically populated with the email address 413 corresponding to the second mobile device 320 only if the second mobile device 320 is discoverable to video chat service. If it is determined that the second mobile device 320 is not discoverable to video chat service, the video chat address field 414b will not be automatically populated with the email address 413 of the second mobile device 320.

In this example embodiment, it was determined, using the method 416 described in detail with respect to FIG. 18, that the second mobile device 320 is discoverable to video chat service. Hence, the video chat address field 414b has been automatically populated with the email address 413 corresponding to the second mobile device 320.

Therefore, in an example embodiment, the discoverability of the second mobile device 320 is automatically made known to the first mobile device 316 without manual input from the user of the first mobile device 316. Since video chat contacts are automatically made known to a user of a mobile device, the user does not have to discover video chat contacts by manual means. Making video chat contacts automatically known to users of a mobile device generally helps promote mass adoption of a video chat service.

Turning now to FIG. 11, the email address 408 and video chat address 410 portions of the contact details section 402 are shown, wherein the video chat address field 414c is manually entered by the user of the first mobile device, according to an example embodiment. In the example embodiment, an email address 413 of a second mobile device 320 is inputted in the email address field 412c. It was determined, using the method 416 (FIG. 18), that the second mobile device 320 is not discoverable to video chat service. Hence, the video chat address field 414c was not automatically populated with the email address 413 corresponding to the second mobile device 320. In an example embodiment, the user of the first mobile device 316 may manually input an email address 415 in the video chat address field 414c (block 418). The email address 415 corresponds to a mobile device that may be discoverable. In another example embodiment, the address book application 62 may provide a pop-up window (not shown) to indicate that the second mobile device 320 corresponding to the email address 413 is not discoverable to video chat service. With this prompt, the user of the first mobile device may be more inclined to suggest to the user of the second mobile device to use the video chat service. This may help increase the adoption of the video chat service.

In an example embodiment, the inputted email address 415 may be checked, using the method 416 (FIG. 18), to verify that the inputted email address 415 corresponds to a mobile device that is discoverable to video chat service. This is useful as it prevents a user from adding an incorrect video chat address, causing incorrect information to be stored on the video chat server.

In another example embodiment, the email address is not checked.

Figure 13:
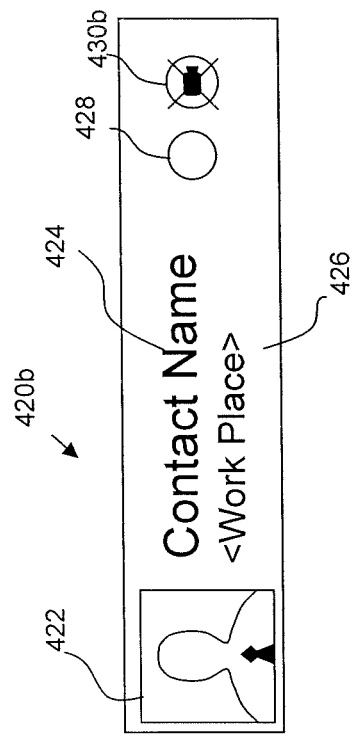
FIG. 13 is a screen shot of another example embodiment of a graphical layout for displaying a contact of a second mobile device.
Figure 12:
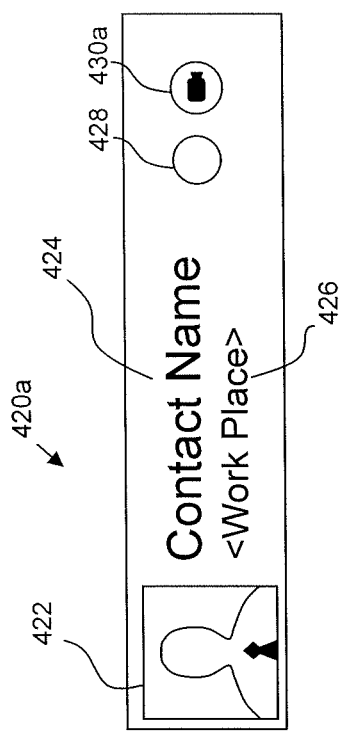
FIG. 12 is a screen shot of an example embodiment of a graphical layout for displaying a contact of a second mobile device.

Referring now to FIGS. 12 and 13, screen shots of an embodiment of a graphical layout 420 of a contact associated with a second mobile device 320 is shown. The graphical layout 420 may be, for example, part of a GUI for an address book or an instant messaging application. The graphical layout 420 includes a display picture 422, a contact name 424, a work place name 426, an availability indicator 428, and a discoverability indicator 430. The availability indicator 428 may change color depending on the availability of the second mobile device 320. For example, the availability indicator 428 may be green or red depending on if the second mobile device 320 is available or unavailable, respectively.

The discoverability indicator 430 likewise indicates whether or not the second mobile device 320 is discoverable to video chat service. In the graphical layout 420a of FIG. 12, the second mobile device 320 is discoverable to video chat service and this is indicated by the discoverability indicator 430a. In the graphical layout 420b of FIG. 13, the second mobile device 320 is not discoverable to video chat service and this is indicated by the discoverability indicator 430b. The discoverability indicator 430b serves to remind the user of the first mobile device 316 that the user of the second mobile device may not be fully utilizing all of the capabilities of his device. The user of the first mobile device may then be prompted to encourage the user of the second mobile device to adopt the video chat service. Hence, the discoverability indicator 430b may help to increase the adoption of the video chat service.

It can be appreciated that the discoverability of a second mobile device 320 can also be indicated by the presence or absence of the discoverability indicator 430. For example, if the second mobile device 320 is not discoverable to video chat service, then the graphical layout 420 will not provide the discoverability indicator 430.

Figure 14B:
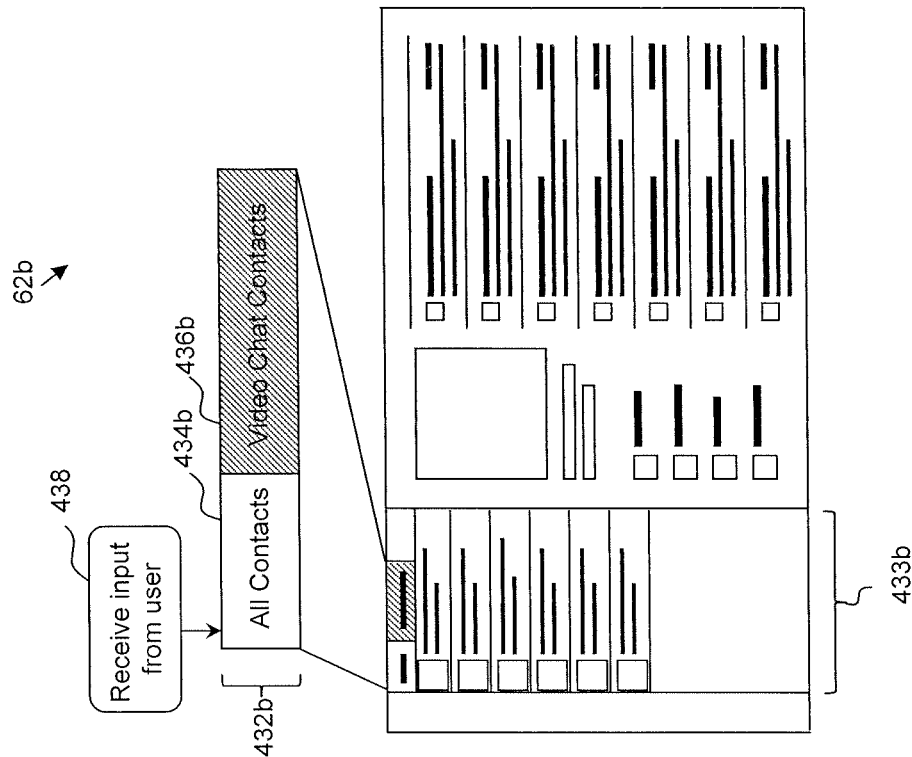
FIG. 14B is a screen shot of an address book application of the first mobile device, wherein only video contacts are shown, according to an example embodiment.
Figure 14A:
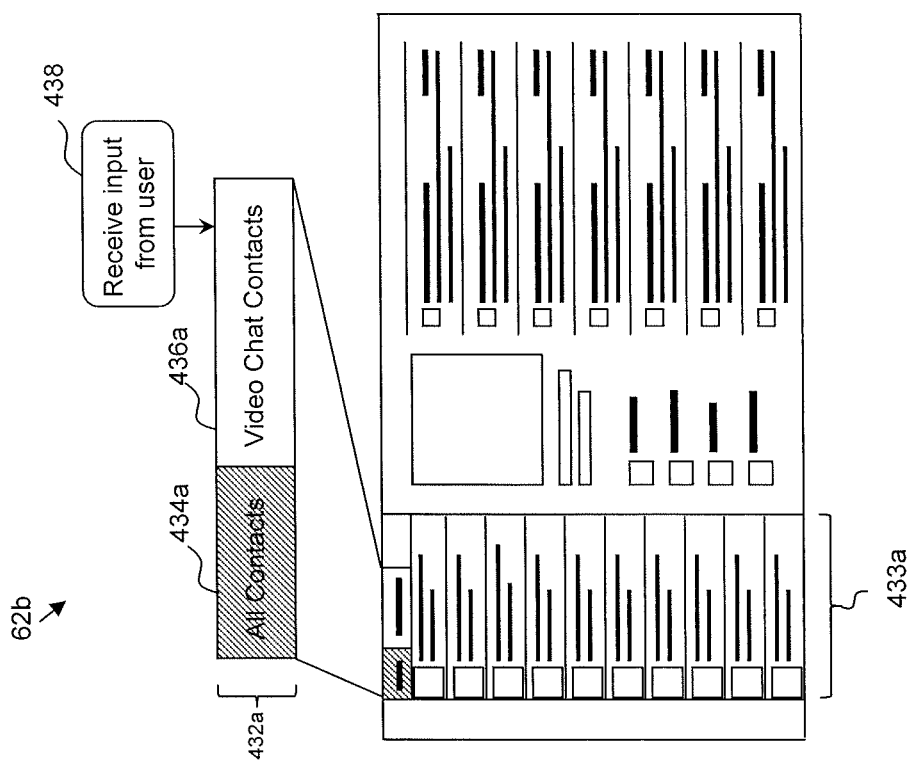
FIG. 14A is a screen shot of an address book application of the first mobile device, wherein all contacts are shown, according to another example embodiment.

Turning now to FIGS. 14a and 14b, a screen shot of an address book application 62b of the first mobile device 316 is shown, according to another example embodiment. The address book application 62b provides a selector 432 for switching between viewing all contacts and viewing only video contacts. FIG. 14A shows the address book application 62b with "All Contacts" 434a selected. In this view, a listing 433a of all contacts, including contacts that are discoverable to video chat service and contacts that are not discoverable to video chat service, are displayed. FIG. 14B shows the address book application 62b with "Video Chat Contacts" 436b selected. In this view, a listing 433b of only contacts that have video chat service are displayed. The address book application 62b may receive an input 438 from the user of the first mobile device 316 to switch between "All Contacts" 434 and "Video Chat Contacts" 436.

The view of FIG. 14B provides a convenient method for browsing through video chat contacts when, for example, the user of the first mobile device 316 is looking specifically to engage in video chat sessions with contacts. It can be appreciated that the listing 433b of only contacts that are discoverable to video chat service can be utilized by the video chat application 312 and the video chat contacts database 314a to provide a listing of contacts that is specific to the video chatting service.

Methods for managing video chat contacts using a video chat server 324 will now be described with reference to FIGS. 15 to 24.

Figure 15:
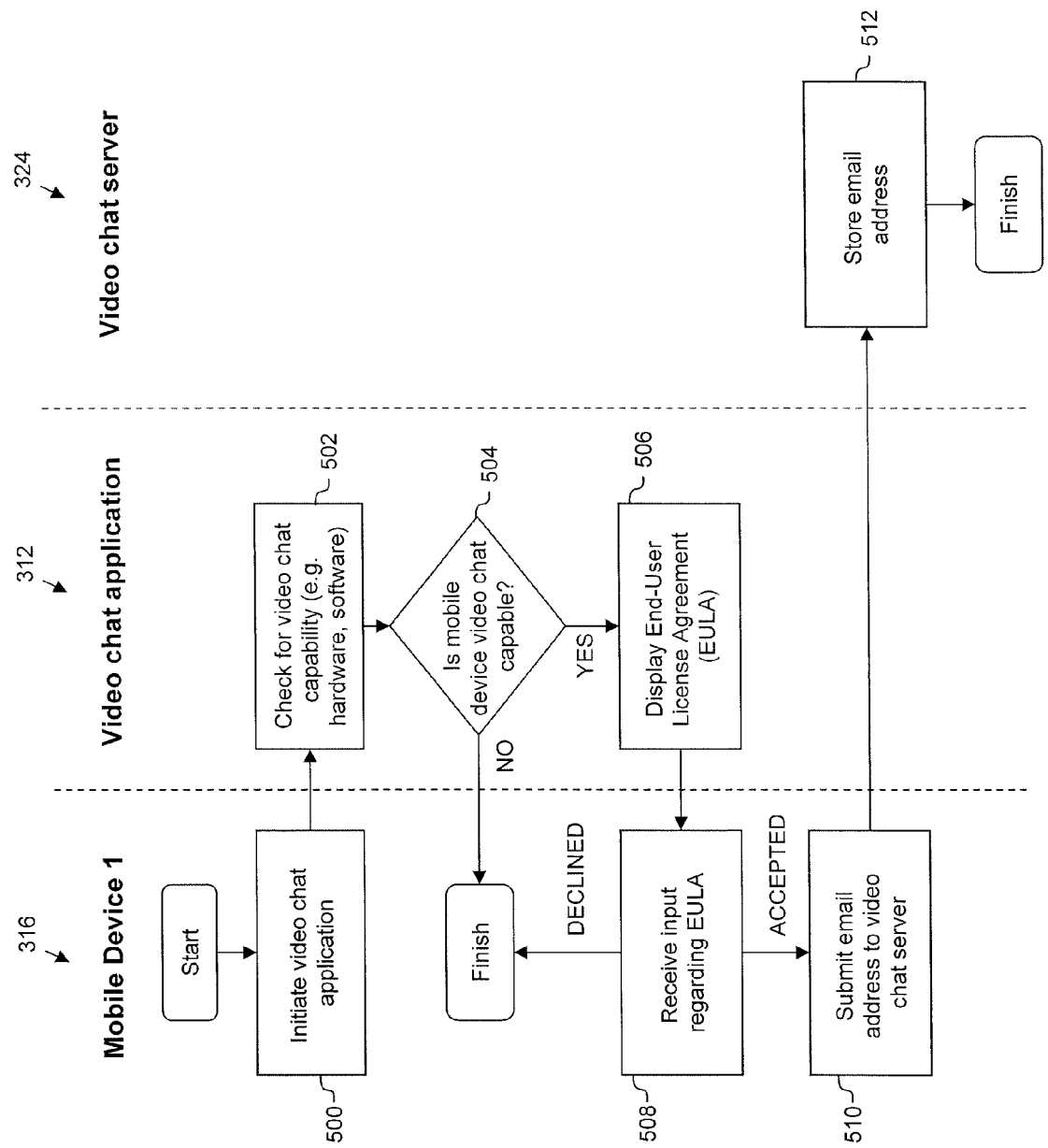
FIG. 15 is a flow diagram of computer executable or processor implemented instructions for determining if a first mobile device is discoverable for video chat, according to an example embodiment.

Turning now to FIG. 15, a flow diagram of computer executable or processor implemented instructions for determining if a first mobile device is discoverable for video chat, according to an example embodiment, is shown. This method may be used, for example, by a video chat application 312 or an address book application 62, to determine which contacts are discoverable to video chat service.

At block 500, the video chat application 312 is initiated by the first mobile device 316. In an example embodiment, the user of the first mobile device 316 navigates to the video chat icon 51 in the home screen 40 using the selection cursor 18 (FIG. 6). The user then initiates the video chat application 312 using, for example, an enter key (not shown) or a touch gesture (not shown).

At blocks 502 and 504, the video chat application 312 checks the first mobile device 316 for video chat capability. Various methods can be used to perform blocks 502 and 504. In an example embodiment, the video chat server 324 receives a first mobile device ID 310 (e.g. email address). In an example embodiment, the video chat server 324 determines the video chat capability of the first mobile device 316 based on a look-up table (not shown). The look-up table provides the video chat capability associated with at least one email address or mobile device ID. The look-up table may, for example, indicate that a device model associated with certain model device ID's is not video chat capable. For example, a certain model of a mobile device does not have a camera 123, or the mobile device does not support a video chat application. In other words, information about video hardware capability of a given electronic device can be derived from the device ID.

In another example embodiment, the video chat capability of the first mobile device 316 may be determined using the first mobile device 316 (not shown). For example, the operating system 134 of the first mobile device 316 may determine if the first mobile device 316 has a camera 123 and a video chat application 55.

If the first mobile device 316 is determined to be not video chat capable, then the method is terminated. If the first mobile device 316 is determined to be video chat capable, then the method proceeds to block 506.

At block 506, the video chat application 312 displays an End-User License Agreement (EULA). In an example embodiment, the EULA is displayed in a pop-up window in the video chat application 312. It can be appreciated that the EULA may be displayed outside of the context of a video chat application 312. For example, the EULA may be displayed when the first mobile device 316 is powered on for the first time. For example, the EULA may be displayed in a message application 138 by way of recommending the user of the first mobile device 316 to activate video chat service to engage in video chat sessions with video chat contacts.

At block 508, the first mobile device 316 receives a user input for either accepting or declining the EULA. Any suitable form of user input may be used. If the user declines the EULA, then the method is terminated. If the user accepts the EULA, then the method proceeds to block 510.

At block 510, the first mobile device 316 submits a first email address 306 of the user of the first mobile device 316 to the video chat server 324. In another example embodiment, the first mobile device 316 also submits the first mobile device ID 310 to the video chat server 324.

At block 512, the video chat server 324 stores the first email address 306. The action provided by block 512 makes the first mobile device 316 associated with the first email address 316 discoverable by definition. In an example embodiment, the first email address 306 is added to the listing 325 of email addresses. In an example embodiment, a new entry is created under a registrar in the video chat server 324. The entry may include the email address in the form of a string. In another example embodiment, the entry includes the first mobile device ID 310. The first mobile device ID 310 may be used by the video chat server 324 to identify which mobile device corresponds to the email address 306 during provisioning of the video chat service.

In another example embodiment, only email addresses having certain domain names may be able to be registered on the video chat server 324. For example, block 512 may be modified so that a decision is made as to whether to store the first email address 316 in the video chat server 324 (not shown). For example, if an email address does not use the domain name "@widgetcorp.ca", then the method of FIG. 15 is terminated and the first mobile device 316 is made not discoverable by definition. Email addresses having the domain name "@widgetcorp.ca" will be stored in the video chat server 324 according to block 512, and hence the first mobile device 316 is made discoverable by definition. This feature may be used by the video chat server 324 to limit participants of the video chatting service. This is useful for certain scenarios. For example, a company hosting a video chat server 324 may only want mobile devices associated with a company email address to be capable of accessing video chat service. However, in another example embodiment, email addresses having other domain names can be registered on the video chat server.

It can be appreciated that blocks 502, 504 and 506 may be performed by another software entity on the first mobile device 316. For example, the operating system 134 of the first mobile device 316 may perform the task of checking for video chat capability 502, 406, and displaying the EULA 506. For example, the EULA 506 may be displayed on the home screen 40.

In another example embodiment, the method described in FIG. 15 may be performed only once for a given first mobile device 316. For example, the method may only be performed upon initiating the video chat application 312 for the first time.

In another example embodiment, an additional step is taken before block 506 to compare the first email address 306 corresponding to the first mobile device 316 with the listing of email addresses in the video chat server 324. The listing 325 of email addresses in the video chat server 324 consists of only email addresses associated with mobile devices that are discoverable, in accordance with the system of FIG. 1. Hence, if a match is found, the first mobile device 316 associated with the first email address 306 is determined to be already discoverable, and the method of FIG. 15 is terminated. If a match is not found, then the first mobile device 316 associated with the first email address 306 is determined to be not discoverable, and the method proceeds to block 506. This process ensures that an email address corresponding to a mobile device that is discoverable is not added again to the video chat server 324 if the email address already exists in the video chat server 324.

Figure 16:
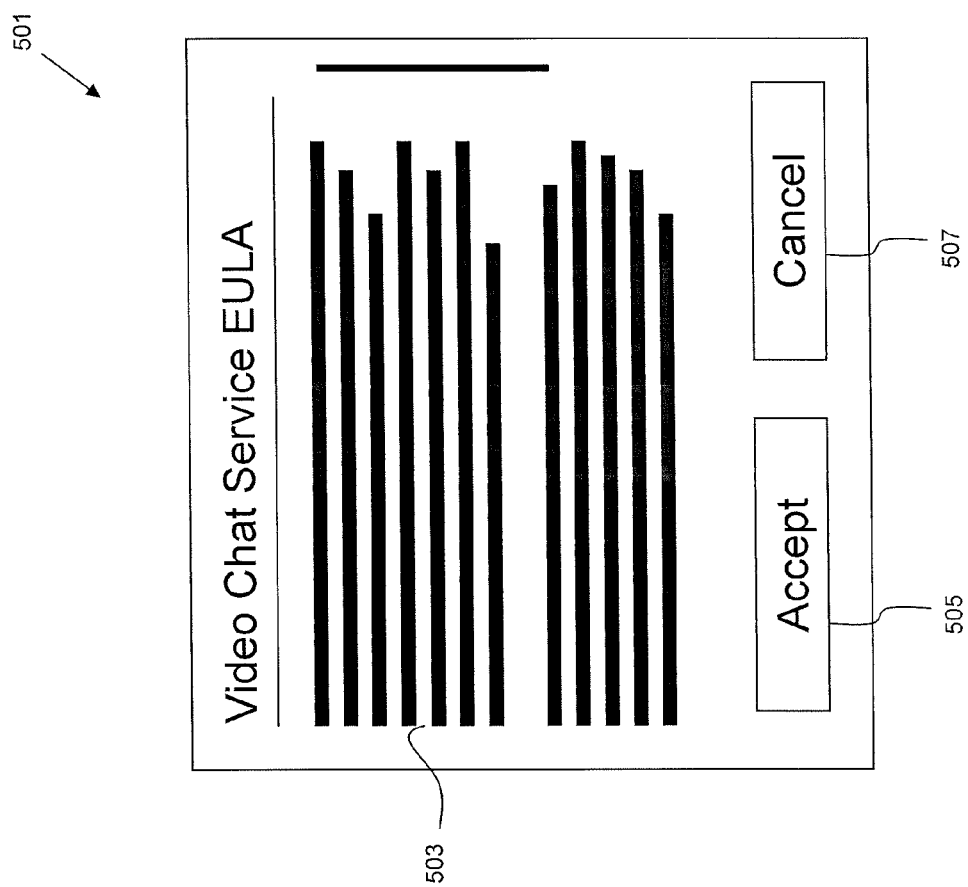
FIG. 16 is a graphical user interface of an End-User License Agreement, according to an example embodiment.

Turning now to FIG. 16, an example embodiment of a graphical user interface (GUI) 501 for an End-User License Agreement (EULA) is shown. The GUI 501 includes a body text 503, an "Accept" button 505 and a "Cancel" button 507.

Figure 17:
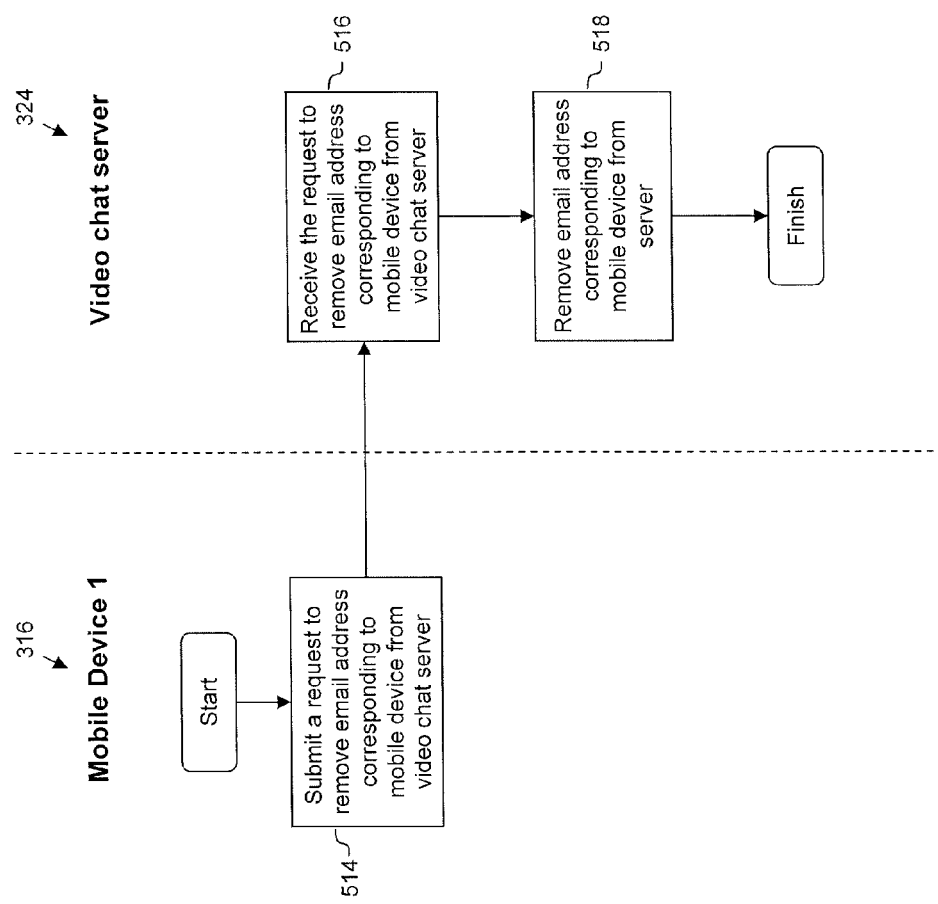
FIG. 17 is a flow diagram of computer executable or processor implemented instructions for determining if a first mobile device is no longer discoverable for video chat, according to an example embodiment.

Turning now to FIG. 17, a flow diagram of computer executable or processor implemented instructions is provided for changing the discoverability of a first mobile device 316, so that it is no longer discoverable for video chat.

At block 514, the first mobile device 316 submits a request to the video chat server 324 to remove a first email address 306 corresponding to the first mobile device 316 from the video chat server 324. In an example embodiment, the request is automatically initiated by the first mobile device 316 in certain scenarios. For example, when a user deactivates a particular email address, e.g. by removing the email address from an email service provider, the first mobile device 316 may detect this action and initiate block 514. For example, when a user initiates the process of deactivating the first mobile device 316 from service, e.g. by unsubscribing to a wireless service provider, the first mobile device 316 detects this action and initiates block 514. For example, when a user manually unsubscribes to the video chat service, e.g. by declining the EULA after having used the video chat service for a period of time, the first mobile device 316 detects this action and initiates block 514.

At block 516, the video chat server 324 receives the request from the first mobile device 316 to remove the email addresses 306 corresponding to the first mobile device 316 from the video chat server 324.

At block 518, the video chat server 324 removes the email address 306 corresponding to the first mobile device 316 from the video chat server 324, making the first mobile device 316 not discoverable by definition. In an example embodiment, the entry corresponding to the first email address 306 is removed from the listing 325 of email addresses in the video chat server 324. In another example embodiment, values associated with the first email address 306, e.g. availability and first mobile device ID 310, are also removed from the video chat server 324.

Figure 27:
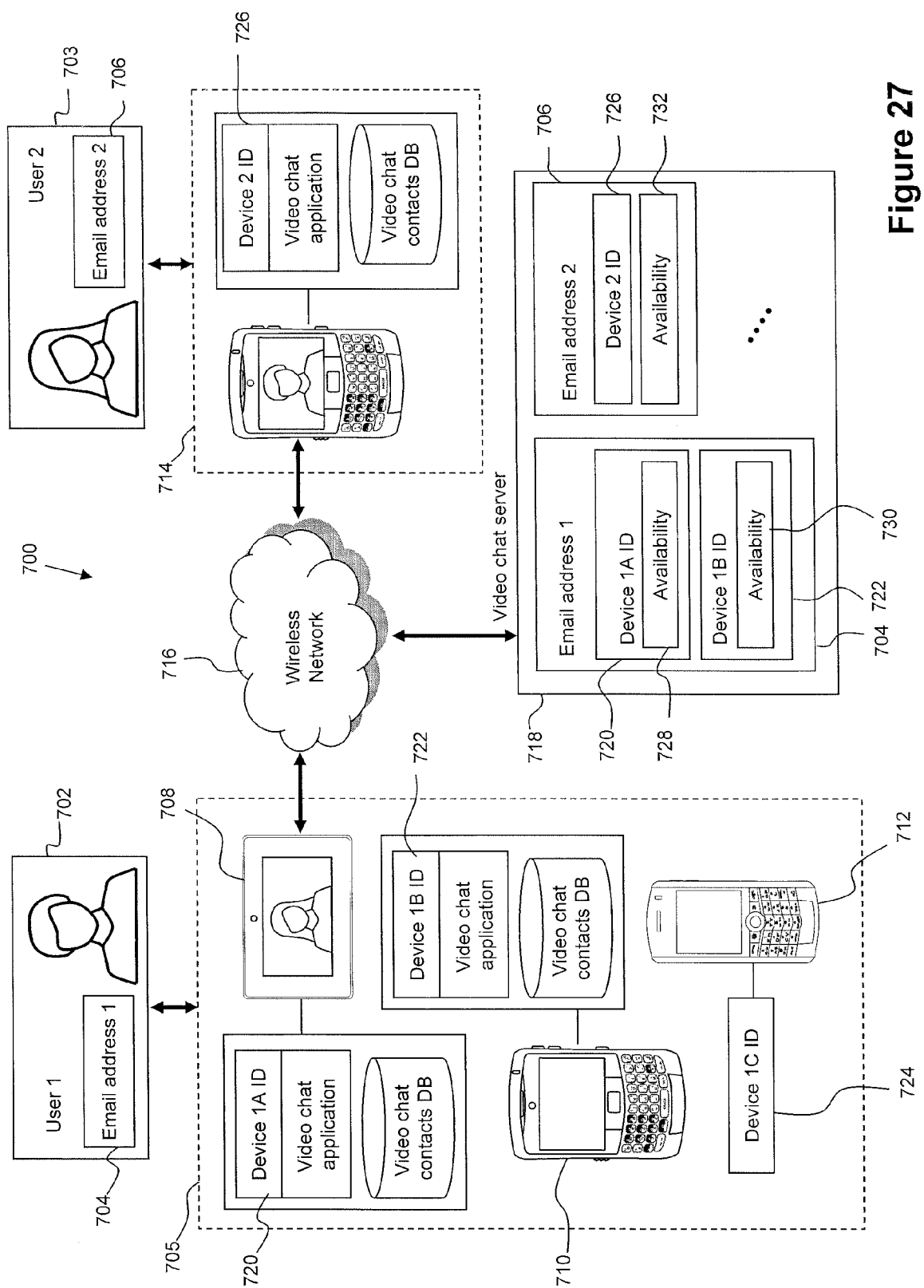
FIG. 27 is a block diagram of a video chat system according to another example embodiment.

In another example embodiment video chat system, one or more email addresses 306 may correspond to a first mobile device (see FIG. 27). For this example embodiment, at block 516, the video chat server 324 receives the request from the first mobile device 316 to remove the one or more email addresses corresponding to the first mobile device 316 from the video chat server 324. For this example embodiment, at block 518, the video chat server 423 removes the one or more email addresses corresponding to the first mobile device 316 from the video chat server 324.

Turning now to FIG. 18, a flow diagram of computer executable or processor implemented instructions 416 for determining if a second mobile device 320 is discoverable for video chat, according to an example embodiment, is provided. In an example embodiment, this method is used by an address book application 62 of FIGS. 8 to 11 to automatically discover video chat contacts.

At block 530, a first mobile device 316 sends a request to the video chat server 324 to determine discoverability associated with a second email address 308. Consistent with the system of FIG. 1, the second email address 308 is associated with a second mobile device 320. This block 530 can be initiated in response to various actions performed on the first mobile device 316, and can be initiated by the operating system 134 or software components 136 of the first mobile device 316. For example, an address book application 62 can perform block 530 in response to an email address being entered or edited in the email address field 412 under the contact details section 402 of the address book application 62. Similarly, an address book application 62 can perform block 530 in response to a video chat address being entered or edited in the video chat address field 414 under the contact details section 402 of the address book application 62. For example, an address book application 62 can perform block 530 for all stored contacts whenever the address book application 62 is opened. For example, the operating system 134 of the first mobile device 316 can periodically perform block 530 as part of a routine. For example, the address book application 62 may be the address book application 62a of FIGS. 8 to 11. It can be appreciated that the operation in block 530 can be initiated in various ways.

At block 532, the video chat server 324 receives the request from the first mobile device 316 to determine the discoverability associated with the second email address 308.

At blocks 534 and 536, the video chat server 324 optionally determines if the first mobile device 316 is video chat capable. These blocks prevent a mobile device that is not video chat capable from adding video chat contacts. Although the first mobile device 316 may be video chat capable, the first mobile device 316 may not be discoverable. For example, the user of the first mobile device 316 may still need to agree to the EULA for the video chat service. However, if the first mobile device 316 is not video chat capable, then the first mobile device 316 cannot be discoverable (see FIG. 27). Where the first mobile device 316 is not discoverable, it can be useful to continue to determine the discoverability of a second mobile device 320. This provides an opportunity to recommend to the user of the first mobile device 316 to adopt the video chat service based on determining that one or more of his contacts is discoverable to video chat. The recommendation may be, for example, in the form of a pop-up window as illustrated later in FIG. 21.

Methods used to perform blocks 534 and 536 are substantially identical to the methods used to perform blocks 502 and 504 of FIG. 15. If the first mobile device 316 is determined not to be video chat capable, then the process ends. If the first mobile device 316 is determined to be video chat capable, then the method proceeds to block 538.

Turning now to block 538, the video chat server 324 compares the second email address 308 with a listing 325 of email addresses provided by the video chat server 324. The listing 325 of email addresses consists of email addresses associated with mobile devices that are discoverable. If no match is found, then the second email address 308 is determined to be associated with a mobile device that is not discoverable, and the method 416 is terminated. In another example embodiment, if no match is found, then the video chat server 324 may return a message to the first mobile device 316 indicating that the second mobile device 320 is not associated with discoverability. If a match is found, then the second email address 308 is determined to be associated with a mobile device that is discoverable, and the method proceeds to block 540.

At block 540, the video chat server 324 returns a message to the first mobile device 316 indicating that the second email address 308 is associated with discoverability. In other words, if an entry in the listing of email addresses on the server 324 matches the second email address, it returns a message to the mobile device. The message is configured to automatically enable addition of the email address as a video chat contact on the first mobile device.

At block 542, the first mobile device 316 enables the addition of the second email address 308 as a video chat contact. In an example embodiment, the address book application 62a is automatically updated with the video chat address of the second mobile device 320 according to FIG. 10. Referring briefly to FIG. 10, the video chat address field 414 under the contact details section 402 of the contact corresponding to the second email address 308 is automatically filled with the second email address 308. In another example embodiment, the graphical layout 420 associated with a contact of the second mobile device 320 is updated to indicate that the contact is discoverable to video chat, as in FIG. 12. Referring briefly to FIG. 12, the graphical layout 420 may be updated to include the discoverability indicator 430a.

Figure 19:
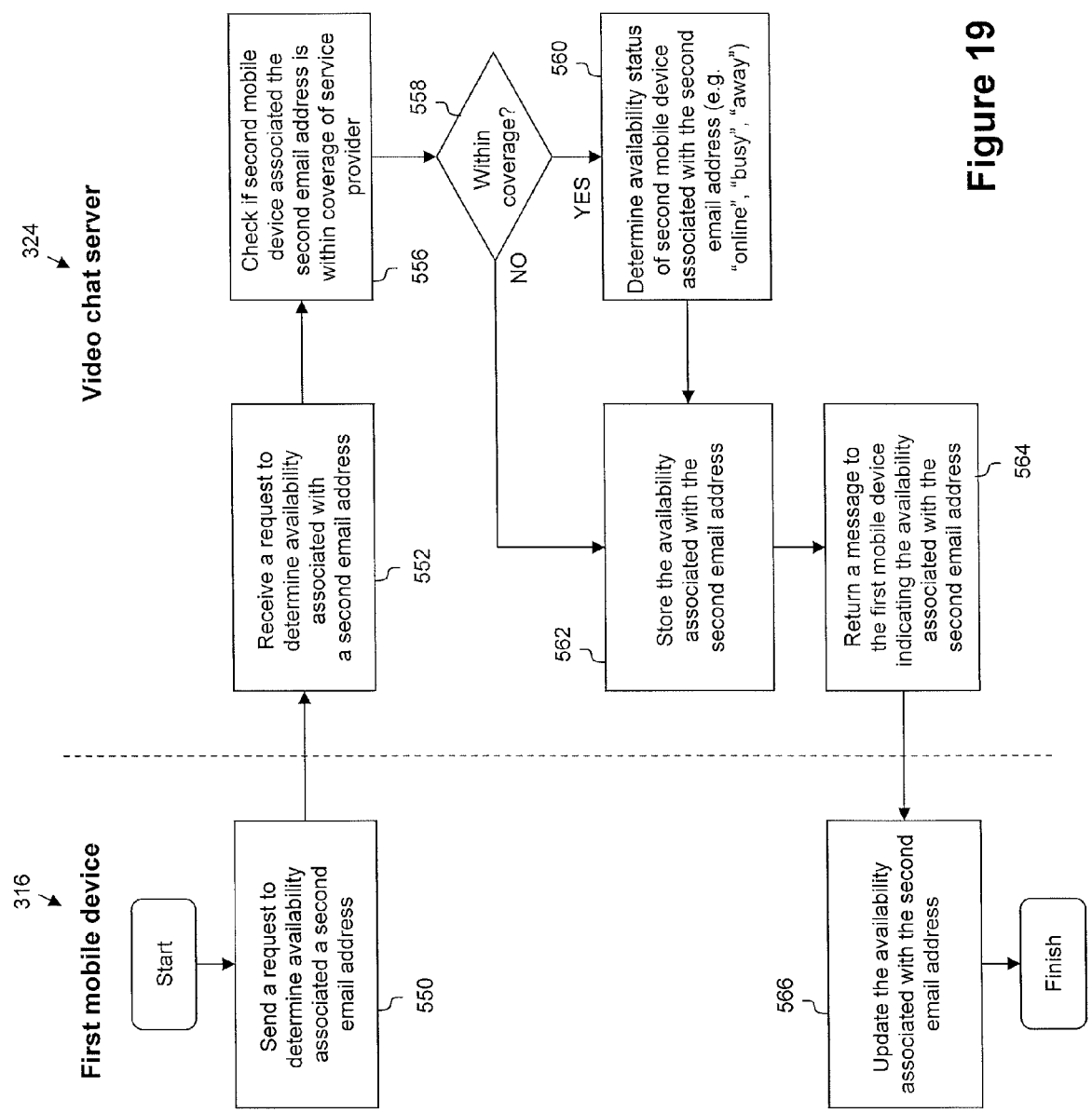
FIG. 19 is a flow diagram of computer executable or processor implemented instructions for determining if a second mobile device is available for video chat, according to an example embodiment.

Turning now to FIG. 19, a flow diagram of computer executable or processor implemented instructions for determining if a second mobile device 320 is available for video chat, according to an example embodiment. This method may be used, for example, by an address book application 62 or a video chat application 312.

At block 550, the first mobile device 316 sends a request to the video chat server 324 to determine an availability associated with a second email address 308. Consistent with the system of FIG. 1, the second email address 308 corresponds to a second mobile device 320.

At block 552, the video chat server 324 receives the request from the first mobile device 316 to determine the availability associated with the second email address 308. Block 550 can be initiated in response to various actions performed on the first mobile device 316, and may be initiated by the operating system 134 or software components 136 of the first mobile device 316. For example, an address book application 62 or the video chat application 312 may perform block 550 upon being opened from the home screen 40. For example, the address book application 62 or the video chat application 312 may perform block 550 for each video chat contact 434b listed under the address book 62 or the video chat contacts database 314b. For example, the operating system 134 of the first mobile device 316 can periodically perform block 550 as part of a routine.

In this example embodiment, the second mobile device 320 is discoverable to video chat service, and therefore the listing 325 of email addresses includes an entry corresponding to the second email address 308. In this example embodiment, the entry further includes values associated with availability of the second mobile device 320 and a mobile device ID 311 of the second mobile device 320. The second mobile device ID 311 can then be used by the video chat server 324 to identify the second mobile device 320 to, for example, determine the availability of the second mobile device 320.

It can be appreciated that the method of FIG. 19 can be modified to include an operation (not shown) following block 552 wherein the video chat server 324 first checks that the second mobile device is discoverable. For example, the video chat server can implement blocks 538 of FIG. 18, that is, to compare the second email address 308 with a listing 325 of email addresses. If a match is found, then the second mobile device 320 associated with the second email address 308 is determined to be discoverable, and the method can proceed to, for example, block 556. If a match is not found, then the second mobile device 320 associated with the second email address 308 is determined to be not discoverable. If this is the case, then the method is either terminated, or the video chat server 324 may provide an indication to the first mobile device 316 to notify that the second mobile device 230 is not discoverable to video chat service.

At blocks 556 and 558, the video chat server 324 determines if the second mobile device 320 associated with the second email address 308 is within coverage of a service provider. In an example embodiment, the service provider is a cellular service provider (not shown). In an example embodiment, the video chat server 324 does this check by checking if the second mobile device 320 is actively connected to the cellular service provider. In an example embodiment, the active connection consists of an active Transmission Control Protocol (TCP). In another example embodiment, the active connection consists of a Transport Layer Security (TLS) connection. Currently known and future known methods for determining availability can also be used.

If it is determined that the second mobile device 320 is not within coverage, the method is continued at block 562. If it is determined that the second mobile device 320 is within coverage, then method is continued at block 560.

At block 560, the video chat server 324 determines an availability status of the second mobile device 320 associated with the second email address 308. The availability status is set by a user of the second mobile device 320. The availability status can be, for example, "busy", "active", or "unavailable". After determining the availability status of the second mobile device 320, the method is continued at block 562.

At block 562, the video chat server 324 stores the availability associated with the second email address 308. Since a listing 325 of email addresses is already provided by the video chat server 324, the information pertaining to the availability associated with an email address can simply be appended to the pre-existing data. For example, an integer value can be assigned to the availability status corresponding to an email address, e.g. 0 for "unassigned", 1 for "active", 2 for "busy" and 3 for "unavailable". This integer value can then, for example, be appended to the corresponding email address within a registrar of the video chat server 234. Thus, a single registry of the video chat server 324 can provide both information pertaining to discoverability (e.g. by the presence or absence of an email address within the registry) and the availability of a mobile device.

At block 564, the video chat server 324 returns a message to the first mobile device 316 indicating the availability associated with the second email address 308.

At block 566, the first mobile device 316 updates the availability associated with the second email address 308. In an example embodiment, graphical layout 420 of a contact associated with a second mobile device is updated, as in FIGS. 12 and 13. Returning to FIGS. 12 and 13, the availability indicator 428 of the graphical layout 420 may be updated to reflect the updated availability of the contact corresponding to the second mobile device 320. For example, the availability indicator 428 can change from being a red color to a green color if the second mobile device 320, which was determined to be unavailable based on a past iteration of the method of FIG. 19, has now been determined to be available based on the most recent iteration of the method of FIG. 19.

The usage of the email address to uniquely identify a user of a mobile device is useful in that an email address, in many cases, is often not changed. In comparison, a user's phone number or work address may not be as effective as serving as a unique identifier, since phone numbers and work addresses may be re-assigned to other users over a period of time. For example, a video chat server might become out of date if users of mobile devices are identified using a phone number. Having an email address as the unique identifier enhances the relevancy of the listing 325 of video chat contacts of the video chat server 324 and mitigates the probability of storing invalid video chat contact information due to, for example, a change in phone number or a change in street address.

Using an email address to uniquely identify a user of a mobile device is useful when considering the privacy of subscribers. For example, an email address is typically not publicly searchable information. In contrast, a phone number is more easily publicly searchable. Therefore, when an email address is used as the unique identifier, the discoverability of a user of a mobile device may only be made known to, for example, friends, family and coworkers of the mobile device, instead of being generally searchable public information. This further prevents a user of a mobile device from receiving unsolicited video calls.

By differentiating between video chat capability and discoverability, privacy considerations regarding subscription to a service can be addressed. For example, a user of a mobile device may have video chat capability, but may choose not to be discoverable due to privacy reasons. The systems and methods described above provide such user with a method for making his mobile device not discoverable even if his mobile device is video chat capable.

In an example embodiment, a dedicated video server has scalability benefits. It is easier to add in a new video availability server for more capacity. Additionally, query traffic only affects a given machine, instead of consuming data and processing resources of a network of generic registration servers with logins and logouts. A dedicated video server is also optimized for a focused purpose, namely supporting video chat discoverability, vide chat status, and video chat registrations.

Systems and methods for promoting adoption of a video chat service will now be described with reference to FIGS. 20 to 22.

Figures 20, 21:
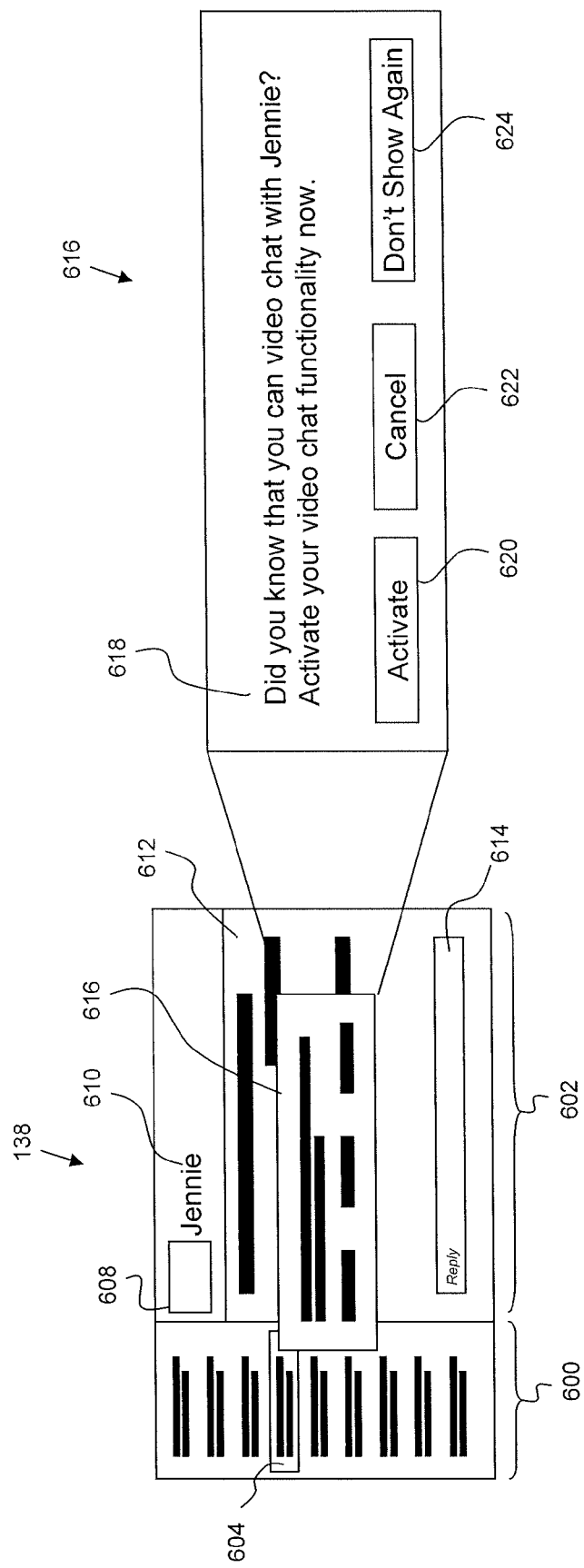
FIG. 20 is a screen shot of an example embodiment of a message application of a first mobile device.
FIG. 21 is a screen shot of an example embodiment of a message pop-up window of the message application of FIG. 20.

Turning now to FIG. 20, a screen shot of an example embodiment of a message application 138 of a first mobile device 316 is shown. The message application 138 may, for example, be an instant messaging program. In another example embodiment, the message application 138 is an email application 57. The message application 138 includes a listing 600 of contacts available for messaging, a contact selector 604, and a messaging interface 602 which provides a graphical user interface (GUI) for chatting with the contact highlighted by the contact selector. The highlighted contact 604 is associated with a second mobile device 320. The messaging interface 602 includes a display picture 608, a contact name 610, a dialog window 612 and a "reply" field 614. The display picture 608 and the contact name 610 correspond to the contact associated with the second mobile device 320. The dialog window 612 provides a history of the conversation between the user of the first mobile device 316 and the contact associated with the second mobile device 320.

In the example embodiment, a pop-up window 616 is displayed according to a method, which will be described later with respect to FIG. 22. The pop-up window 616 notifies the user of the first mobile device 316 that the contact associated with the second mobile device 320 is discoverable to video chat service. It can be appreciated that other methods of notification are possible, including receiving an email, or "in-line" notification as part of the dialog window 612.

Turning now to FIG. 21, the pop-up window 616 includes a notification text 618, an activation button 620, a "Cancel" button 622, and a "Don't Show Again" button 624. The notification text 618 conveys to the user of the first mobile device 316 that the contact associated with the second mobile device 320 is discoverable to video chat service. The buttons can be activated by any suitable form of user input.

Figure 22:
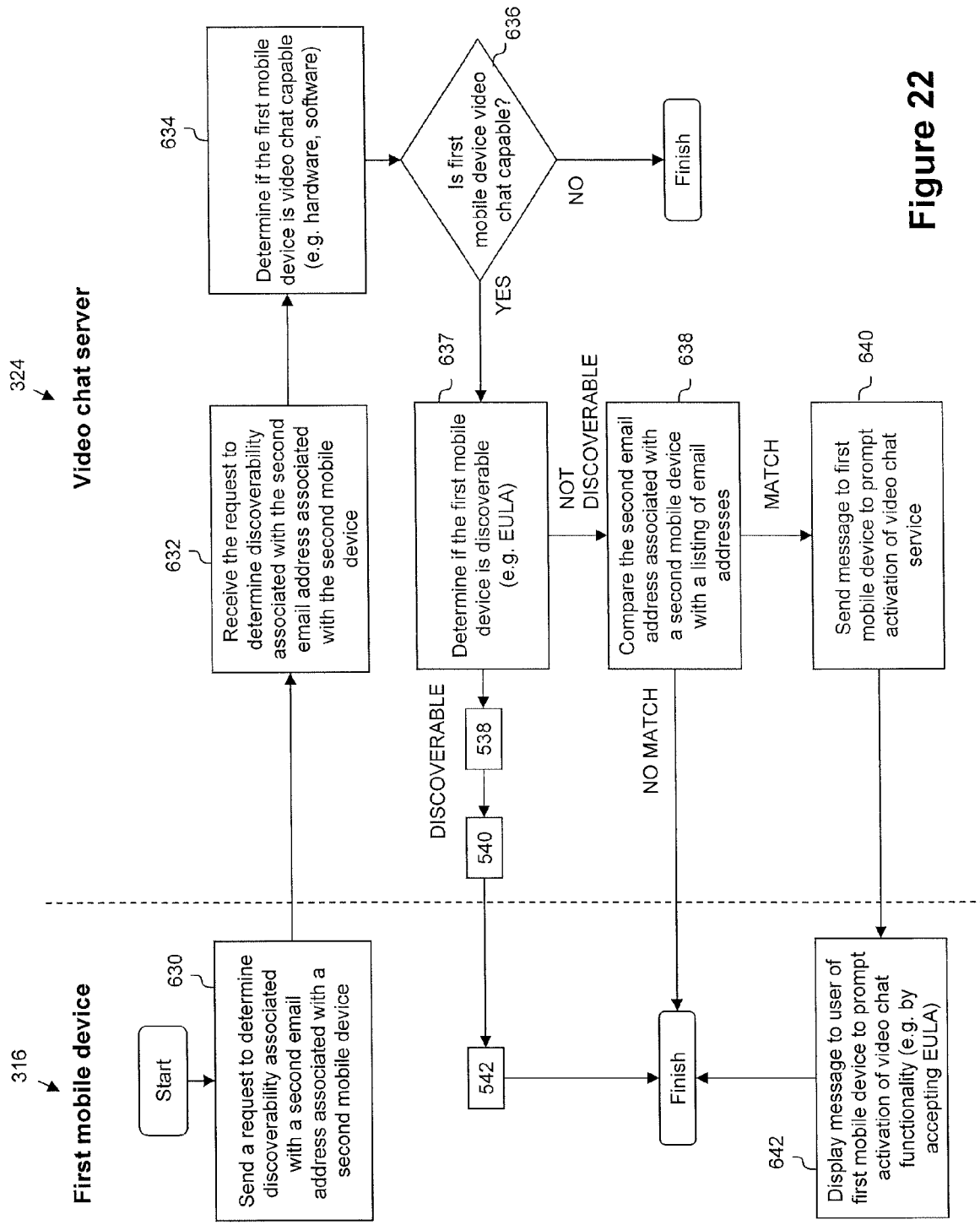
FIG. 22 is a flow diagram of computer executable or processor implemented instructions for promoting mass adoption of a video chat service, according to an example embodiment.

If the activation button 620 receives a user input, the first mobile device 316 may then proceed to activate video chat functionality for the first mobile device 316 according to the method described in FIG. 22.

If the "Cancel" button 622 receives a user input, the pop-up window 616 is closed, and the message application 138 may resume normal operation. In an example embodiment, if the user of the first mobile device 316 engages in a message session with the contact associated with the second mobile device 320 during a future time, then the pop-up window 616 may reappear.

If the "Don't Show Again" button 624 is selected by the user of the first mobile device 316, then pop-up window 616 is closed. In an example embodiment, the message application 138 may receive instructions to suppress the pop-up window 616 for future message sessions with the contact associated with the second mobile device 320 or for all other future message sessions. In another example embodiment, the message application 138 or the operating system 134 of the first mobile device 316 may provide settings options (not shown) to revoke the suppression of the pop-up window 616.

Turning now to FIG. 22, a flow diagram of computer executable or processor implemented instructions for promoting mass adoption of a video chat service, according to an example embodiment, is shown.

At block 630, the first mobile device 316 sends a request to the video chat server 324 to determine the discoverability associated with a second email address 308. The second email address is associated with a second mobile device 320, in accordance with the system of FIG. 1. This block 630 may be initiated in response to various actions performed on the first mobile device 316, and may be initiated by the operating system 134 or software components 136 of the first mobile device 316. In an example embodiment, a message application 138 may perform block 630 when a new messaging session with a contact associated with a second mobile device 320 is initiated. In another example embodiment, an address book application 62 or a video chat application 312 may perform block 630 whenever the address book application 62 or the video chat application 312, respectively, is initiated. In an example embodiment, the address book application 62 or the video chat application 312 may perform block 630 for each contact listed under the address book application.

At block 632, the video chat server 324 receives the request to determine discoverability associated with the second email address 308.

At blocks 634 and 636, the video chat server 324 determines if the first mobile device 316 is video chat capable. These steps prevent the system from providing an invalid recommendation, e.g. recommending for the user of the first mobile device 316 to activate video chat service when the first mobile device 316 is not video chat capable. Detailed methods for performing blocks 634 and 636 are similar to the methods for performing blocks 502 and 504 of FIG. 15, respectively. If it is determined that the first mobile device 316 is not video chat capable, then the recommendation is invalid and the process 416 is terminated. If it is determined that the first mobile device 316 is video chat capable, then the method proceeds to block 637.

At block 637, the video chat server 324 determines if the first mobile device 316 is discoverable. In an example embodiment, the method of FIG. 18, wherein the second mobile device is also the first mobile device, can be used to perform block 637. In another example embodiment, the first mobile device 316 performs block 637 by determining if an EULA regarding video chat service has been previously accepted by a user of the first mobile device 316. If it is determined that the first mobile device 316 is discoverable, operations are performed as per blocks 538, 540, and 542, as described earlier. If it is determined that the first mobile device 316 is not discoverable, then the method proceeds to block 638.

At block 638, the video chat server 324 compares the second email address 308 associated with the second mobile device with a listing 325 of email addresses. The listing 325 of email addresses contains only email addresses associated with mobile devices that are discoverable to video chat service. Hence, if a match is found, then the second mobile device 320 is automatically determined to be discoverable. The method then proceeds to block 640. If a match is not found, then the second mobile device 320 is determined to be not discoverable. Hence, the recommendation for the first mobile device 316 based on the incentive of being able to engage in video chat with the second mobile device 320 is invalid, and the method of FIG. 22 is terminated.

At block 642, the first mobile device 316 displays a message to the user of the first mobile device 316 to prompt activation of video chat functionality. In an example embodiment, the message is provided by a messaging application 138 in the form of a pop-up window 616 (FIGS. 19 and 20). In another example embodiment, the pop-up window 616 of FIG. 21 may be activated by the address book application 62 or the video chat application 312 depending on which program initiated block 630 of the described method 416. For example, if block 630 was initiated by a video chat application 312, and it was determined that a plurality of contacts are discoverable to video chat, then the video chat application 312 may initiate a pop-up window 616, prompting the user to activate video chat functionality. In an example embodiment, activating video chat functionality consists of agreeing to a video chat EULA (FIG. 16).

Systems and methods for importing a plurality of video chat contacts from a social network will now be described with reference to FIGS. 23 to 25.

Figures 23, 24:
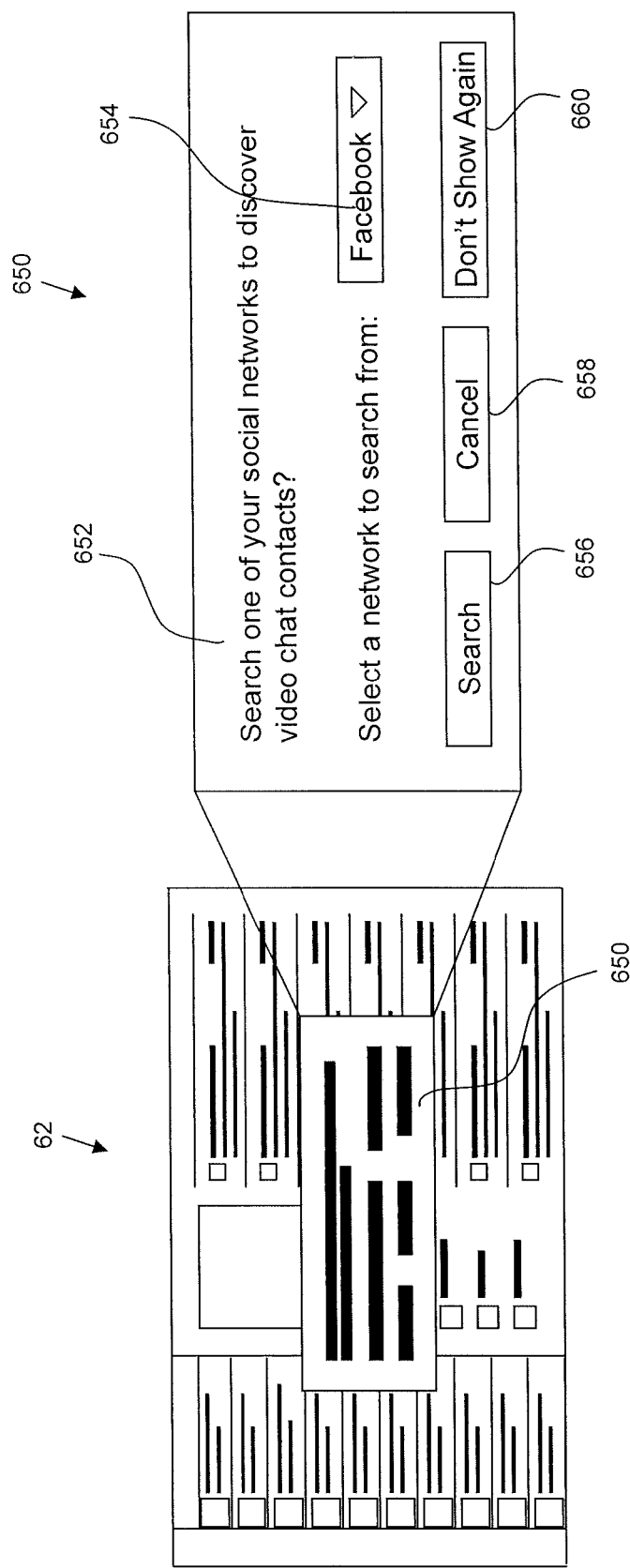
FIG. 23 is a screen shot of an address book application of a first mobile device, according to another example embodiment.
FIG. 24 is a screen shot of a message prompt window of the address book application of FIG. 23, according to an example embodiment.

Turning now to FIG. 23, a screen shot of an address book application 62 of a first mobile device 316, according to another example embodiment, is shown. The address book application 62 has provided a pop-up window 650 to notify the user with the option of searching a social network to discover video chat contacts, wherein the user of the first mobile device 316 is part of the social network. In an example embodiment, the pop-up window 650 is provided each time the address book application 62 is opened.

Referring now to FIG. 24, the pop-up window 650 includes a prompt message 652, a social network selector 654, a "Search" button 656, a "Cancel" button 658 and a "Don't Show Again" button 660. The social network selector 654 provides the user with the option of selecting between a plurality of social networks to import contacts from, provided the user belongs to each of the social networks listed. The buttons may be activated using any suitable form of user input. A method, described below with respect to FIG. 25, will be executed upon activation of the "Search" button. If the "Cancel" button 658 is activated, the pop-up window 650 is closed, and the address book application 62 resumes normal operation. If the "Don't Show Again" button 660 is activated, the pop-up window 650 is closed, the address book application 62 resumes normal operation, and the pop-up window 650 is further prevented from re-appearing when the address book application 62 is re-opened.

It can be appreciated that the pop-up window 650, including the related described systems, can also appear in the context of a video chat application 312.

Figure 25:
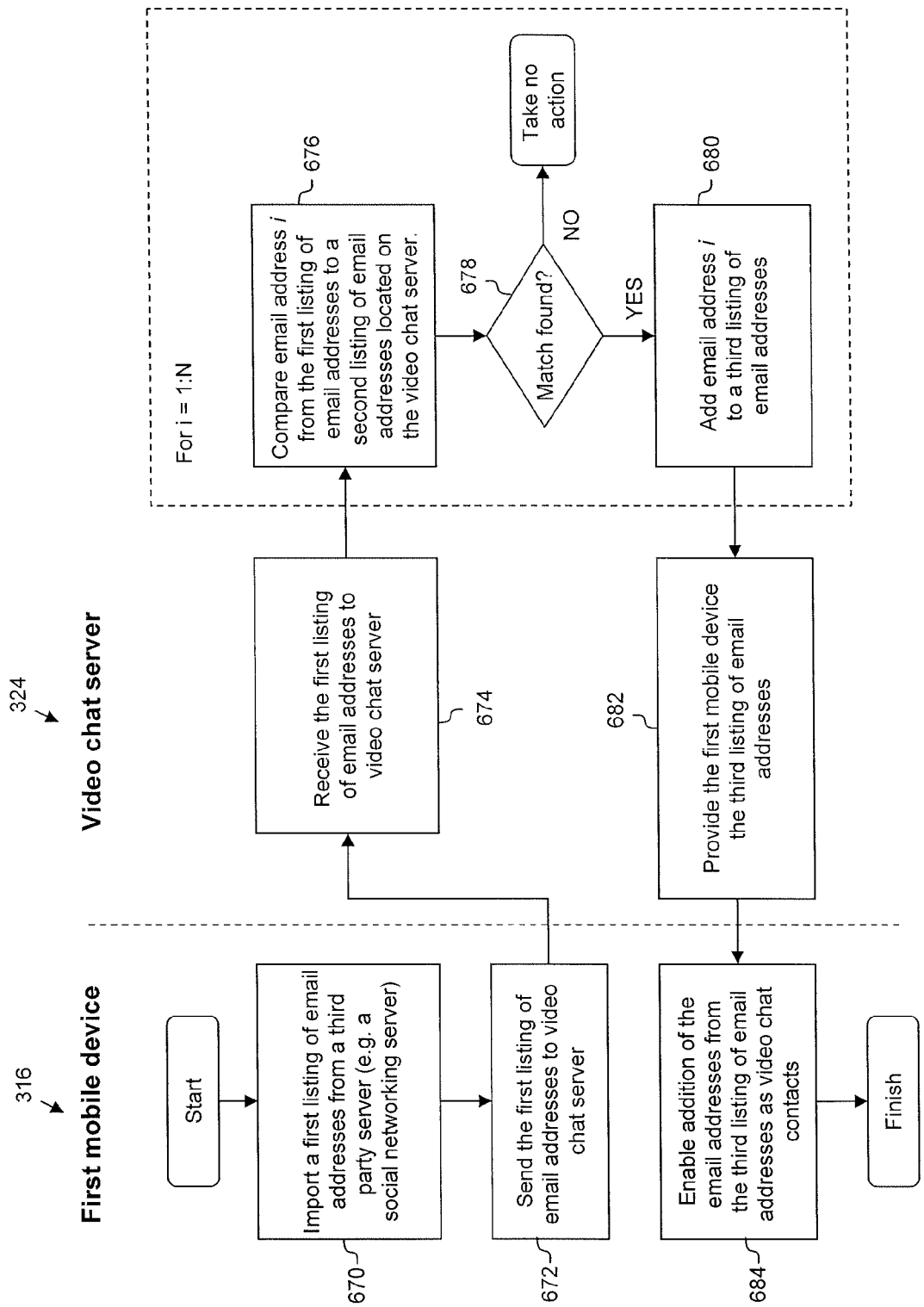
FIG. 25 is a flow diagram of computer executable or processor implemented instructions for determining if a plurality of mobile devices is discoverable for video chat, according to an example embodiment.

Turning now to FIG. 25, a flow diagram of computer executable or processor implemented instructions for determining if a plurality of mobile devices is discoverable for video chat, according to an example embodiment, is shown.

At block 670, the first mobile device 316 imports a first listing of email addresses from a third party server (not shown). In an example embodiment, the third party server is a social networking server which includes a listing of email addresses corresponding to members of the social network. In an example embodiment, the first listing of email addresses correspond to people in the social network of the user of the first mobile device 316.

Proceeding to block 672, the first mobile device 316 sends the first listing of email addresses to the video chat server. At block 674, the video chat server 324 receives the first listing of email addresses.

Blocks 676, 678 and 680 are repeated for each email address i within the listing of email addresses, wherein the listing includes N email addresses.

At block 676, the video chat server 324 compares email address i from the first listing of email addresses to a second listing of email addresses, wherein the second listing of email addresses are associated with mobile devices that are discoverable. The second listing 325 of email addresses is located on the server. If a match is found, then the mobile device corresponding to email address i is determined to be discoverable, and the method proceeds to block 680. If no match is found, then the mobile device corresponding to email address i is determined to be not discoverable, in which case no further action is taken.

At block 680, the video chat server 324 adds email address i to a third listing of email addresses, wherein the third listing consists of a subset of email addresses from the first listing of email addresses, the subset consisting of email addresses associated with mobile devices that are discoverable.

At block 682, the video chat server 324 provides the first mobile device 316 with the third listing of email addresses.

At block 684, the first mobile device 316 enables the addition of email addresses from the third listing of email addresses as video chat contacts.

In another example embodiment, a listing of email addresses are obtained from emails received by the first mobile device 316. For example, as the first mobile device receives an email, the first mobile device obtains the email addresses listed as the "sender" and listed as the other "recipients", if any. It then sends the obtained email addresses to the video chat server 324 to determine if they are video chat capable. If so, the email addresses are automatically added to the video chat database 314a.

More generally, a mobile device sends one or more email addresses to a video chat server 324. The mobile device then receives a message from the video chat server indicating that at least one of the one more email addresses is associated with another electronic device having video chat capability. It then adds the at least one email address to its video chat contact list.

Figure 26:
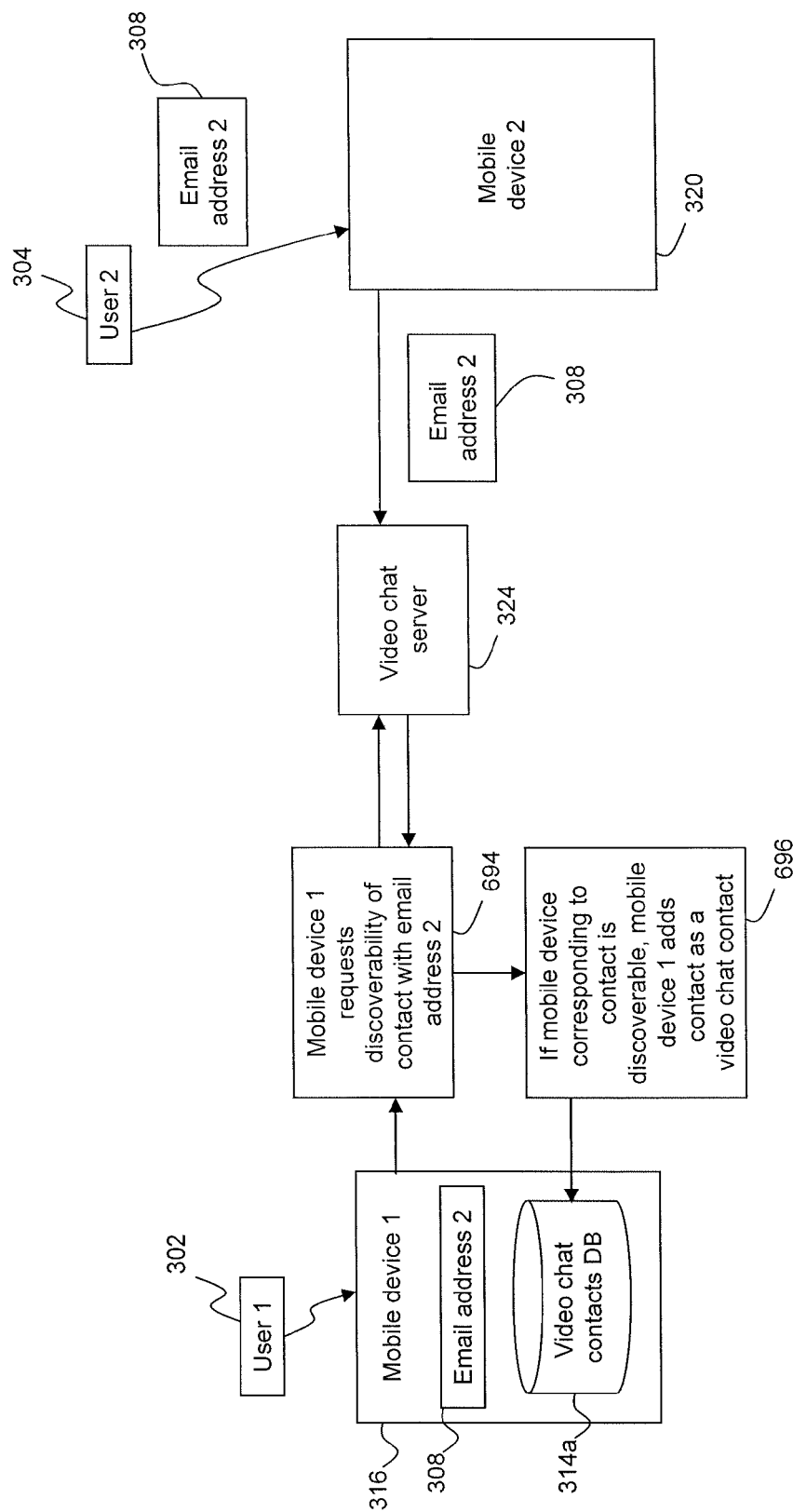
FIG. 26 illustrates a system and method for automatically updating an address book with video chat contacts, according to an example embodiment.

Turning now to FIG. 26, an example embodiment of a method for automatically updating an address book with video chat contacts is shown. User 1 (302) has a first mobile device 316, which has stored thereon email address 2 (308), which is associated with user 2 (304). Initially, user 2 (304) does not have a video chat enabled mobile device, or does have such a device, but is not registered on the video chat server 324. Therefore, email address 2 (308) is stored in the first mobile device 316, but is not listed in the video chat contacts database 314a.

At a later point in time, user 2 (304) uses the second mobile device 320 to register email address 2 (308) with the video chat server 324. In other words, after registration, the video chat server has stored thereon email address 2 (308) corresponding to the second mobile device 320.

At yet a further point in time, the first mobile device 316 sends a request to the video chat server 324 to determine whether the contact with email address 2 (308) is discoverable (block 694). In an example embodiment, the transmission of the request can be invoked periodically. In another example embodiment, it can be invoked by a user input. In another example embodiment, it can be invoked each time user 1 (302) logs into the first mobile device 316. It can be appreciated that the transmission of the request can be invoked by various events.

After receiving the request, the video chat server 324 then determines if email address 2 (308) is discoverable. Email address 2 (308) is now discoverable since it was added to the video chat server 324. Initially, it was not discoverable.

The video chat server 324 sends a message back to the first mobile device 316 indicating that the contact associate with email address 2 (308) has video chat capability. After receiving the message, the first mobile device 316 adds email address 2 (308) to its video chat contacts database 314a.

In this way, a user 1 (302) is automatically made aware if an existing contact (e.g. user 2 (304)) has a mobile device that is video chat capable.

In an example embodiment, using the method described in FIG. 26, a user 1 (302) had user 2 (304) as an email contact (e.g. not video chat contact) on user 1's first mobile device 316. User 2 (304) later purchases or is given a new mobile device 320 that is video chat capable, and registers the same with the video chat server. The first mobile device 316 automatically updates the video chat status of user 2 (304), without user 2 having to alert user 1.

A video chat system 700 wherein a plurality of mobile devices may be associated with a single user will now be described with reference to FIG. 27. Turning now to FIG. 27, a block diagram of another example embodiment of a video chat system is shown. In this example embodiment, a plurality of mobile devices may be associated with an email address.

The video chat system of FIG. 27 includes a first user 702 and a second user 703. The first user 702 is uniquely identified by a first email address 704, and the second user 703 is uniquely identified by a second email address 706. The first user 702 is associated with a plurality of mobile devices 705, which include device 1A 708, device 1B 710 and device 1C 712, each uniquely identified by mobile device IDs 720, 722 and 724, respectively. For example, the first user 702 may be the owner of mobile devices 705. The second user 703 is associated with only one mobile device 714, the mobile device 714 being uniquely identified by a second mobile device ID 726. In the example embodiment, mobile devices 720, 710 and 714 are discoverable to video chat service.

In the example embodiment, the first user 702 is using mobile device 1A 708 to engage in a video chat session with the second user 703, who is using mobile device 2 714. In another example embodiment, the first user 702 may also use mobile device 1B 710 to engage in a video chat session with the second user 703, since mobile device 1B 710 is also discoverable. However, the first user 702 may not user mobile device 1C to engage in a video chat session because mobile device 10 is not video chat capable. For example, mobile device 1C does not have a camera. For example, mobile device 10 does not have a video chat application.

In the example embodiment, a video chat server 718 is provided. The video chat server 718 provides video chatting service and stores a listing of email addresses. For example, the listing may be provided by a registrar. In an example embodiment, the registrar is a Session Initiation Protocol (SIP) registrar. Each email address in the listing are also associated with information regarding mobile device ID and availability. Since an email address may now be associated with a plurality of mobile devices, the email address of a user can no longer uniquely identify the discoverability of a mobile device of the user. Hence, upon detecting that a plurality of mobile devices is associated with a single user, the structure of the registrar may be adjusted to relegate the information which identifies the discoverability of a mobile device from the email address to the mobile device ID. In the adjusted structure, each email address entry may provide a plurality of nested entries corresponding to mobile device IDs. The presence or absence of a particular mobile device ID may now act as the information which uniquely identifies the discoverability of a mobile device of the user. For example, the presence of a mobile device ID will indicate that the mobile device corresponding to the mobile device ID is discoverable. For example, the absence of a mobile device ID indicates that the mobile device corresponding to the mobile device ID is not discoverable.

For each entry corresponding to a mobile device ID, an additional nested entry may be provided which corresponds to an availability for each mobile device ID. This nested structure further serves to uniquely identify the availability for each mobile device.

In another example embodiment, the mobile device 1B 710 may be video chat capable but not discoverable. For example, the first user 702 may have declined the EULA for mobile device 1B 710. For example, the first user 702 may have decided not to make mobile device 710 not discoverable to video chat service due to privacy reasons. In this case, the video chat server will not include the device 1B ID 722 or its associated availability 730.

It can be appreciated that the adjusted structure of the listing of email addresses can coexist with the structure of the listing 325 of email addresses as provided by the system of FIG. 1. For example, since the second user 703 only has one mobile device 714, the discoverability of this mobile device 703 can be associated with the presence or absence of a second email address 706 corresponding to the mobile device 714 as before. It can be appreciated that the structure of the listing of email addresses in the video chat server 718 can be adapted depending on if a user has one mobile device or a plurality of mobile devices.

It can be appreciated that the systems and methods described in FIGS. 2 to 26 may be adjusted to become applicable to the example embodiment of the video chat system of FIG. 27. For example, wherever a method required the provision of an email address, instead, an email address and a mobile device ID is provided. The email address and mobile device ID are then stored in the video chat service based on the structure as described in FIG. 27. Identification of discoverability is then based on the presence or absence of the mobile device ID instead of the presence or absence of the email address.

An example embodiment of a method is provided for managing video chat contacts. It can be performed by a server. The method includes: receiving a request from an electronic device to determine video chat capability associated with an email address; comparing the email address with a listing of email addresses, wherein the listing includes email addresses associated with other electronic devices having video chat capability; and if an entry in the listing matches the email address, returning a message to the electronic device, the message configured to automatically enable addition of the email address as a video chat contact on the electronic device.

In another example embodiment, the server only stores information related to the video chat contacts. In another example embodiment, each one of the email addresses is associated with a device ID, identifying a given electronic device of the other electronic devices. In another example embodiment, information about video hardware capability of the given electronic device is derived from the device ID. In another example embodiment, the server includes availability information stored in association with each one of the email addresses. In another example embodiment, the method further includes, after receiving the request, determining if the electronic device is video chat capable, and if so, comparing the email address with the listing of email addresses. In another example embodiment, if it is determined the electronic device is not video chat capable, the server takes no further action. In another example embodiment, the method further includes: after receiving the request, determining if the electronic device is registered with the video chat server, and if so, comparing the email address with the listing of email addresses. In another example embodiment, the method further includes: after receiving the request, determining if the electronic device is not registered with the video chat server, and if not, sending an other message to the electronic device prompting activation of video chat service. In another example embodiment, the method further includes: after determining the electronic device is not registered with the video chat server, comparing the email address with the listing of email addresses; and, if an entry in the listing matches the email address, the other message further indicating that the email address is associated with a contact that is capable of video chat.

Another example embodiment of a method is provided for adding a video chat contact. It can be performed by an electronic device. It includes: displaying a graphical user interface including an email address field; receiving an email address in the email address field; sending the email address to a video chat server; receiving a message from the video chat server indicating that the email address is associated with another electronic device having video chat capability; and adding the email address to a video chat contact list.

In an example embodiment, the method further includes: after receiving the message, populating a video chat address field in the graphical user interface with the email address. In another example embodiment, if the electronic device is not registered with the video chat server, the electronic device receiving another message prompting activation of video chat service. In another example embodiment, the other message includes an indication that the email address is associated with a contact that is capable of video chat. In another example embodiment, the method further includes: displaying an End User License Agreement (EULA) for activating a video chat service; receiving an input accepting the EULA; and sending a registration to the video chat server, including an email address of the electronic device. In another example embodiment, the registration further includes a device ID of the electronic device.

Another example embodiment of a method is provided for adding a video chat contact, which can be performed by an electronic device. It includes: sending one or more email addresses to a video chat server; receiving a message from the video chat server indicating that at least one of the one more email addresses is associated with another electronic device having video chat capability; and adding the at least one email address to a video chat contact list.

In an example embodiment, multiple email addresses are sent to the video chat server. In another example embodiment, the multiple email addresses are obtained from a social networking server. In another example embodiment, one or more of the email addresses are sent to the video chat server periodically. In another example embodiment, the one or more email addresses are sent to the video chat server after logging into the electronic device.

The steps or operations in the flow charts described herein are just for example. There may be many variations to these steps or operations without departing from the spirit of the invention or inventions. For instance, the steps may be performed in a differing order, or steps may be added, deleted, or modified.

The GUIs and screen shots described herein are just for example. There may be variations to the graphical and interactive elements without departing from the spirit of the invention or inventions. For example, such elements can be positioned in different places, or added, deleted, or modified.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method performed by a server, to manage video chat contacts, comprising:
receiving a request from a first electronic device to determine video chat capability associated with an email address, the email address corresponding to another a second electronic device;
receiving information from the first electronic device used by the server to determine whether the first electronic device is at least video chat capable;
if the first electronic device is at least video chat capable, comparing the email address with a listing of email addresses, wherein the listing includes email addresses associated with other electronic devices having video chat capability; and
after determining that an entry in the listing matches the email address, generating and returning a message to the first electronic device.

2. The method of claim 1 wherein the message is configured to invoke automatic addition of the email address as a video chat contact on the electronic device.

3. The method of claim 1 wherein the server only stores information related to the video chat contacts.

4. The method of claim 1 wherein each one of the email addresses is associated with a device ID, identifying a given electronic device of the other electronic devices.

5. The method of claim 4 wherein information about video hardware capability of the given electronic device is derived from the device ID.

6. The method of claim 1 wherein the server includes availability information stored in association with each one of the email addresses.

7. The method of claim 1 further comprising, after receiving the request, determining if the first electronic device is also discoverable, which includes the first electronic device being video chat capable and subscribed to a video chat service.

8. The method of claim 1, wherein if it is determined the first electronic device is not video chat capable, taking no further action to add the email address as the video chat contact to the first electronic device.

9. The method of claim 1 further comprising: after receiving the request, determining if the first electronic device is registered with the server, and if so, comparing the email address with the listing of email addresses.

10. The method of claim 1 further comprising: after receiving the request, determining if the first electronic device is not registered with the server, and if not, sending an other message to the first electronic device prompting activation of video chat service.

11. The method of claim 10 further comprising:
   after determining the first electronic device is not registered with the server, comparing the email address with the listing of email addresses; and,
   if an entry in the listing matches the email address, the other message further indicating that the email address is associated with a contact that is capable of video chat.

12. A method performed by an first electronic device, to add a video chat contact, comprising:
   displaying a graphical user interface including an email address field;
   receiving an email address in the email address field, the email address corresponding to a second electronic device;
   sending the email address and information about the first electronic device to a video chat server, the information configured for the video chat server to determine whether the first electronic device is at least video chat capable;
   if the first electronic is at least video chat capable, receiving a message generated from the video chat server indicating that the email address is associated with the second electronic device having video chat capability and, afterwards, automatically adding the email address to a video chat contact list on the first electronic device.

13. The method of claim 12 further comprising: after receiving the message, automatically populating a video chat address field in the graphical user interface with the email address.

14. The method of claim 12 wherein if the first electronic device is not registered with the video chat server, the first electronic device receiving an other message prompting activation of video chat service.

15. The method of claim 14 wherein the other message includes an indication that the email address is associated with a contact that is capable of video chat.

16. The method of claim 12 further comprising:
   displaying an End User License Agreement (EULA) to activate a video chat service;
   receiving an input accepting the EULA; and
   sending a registration to the video chat server, including an email address of the first electronic device.

17. The method of claim 12 wherein the information further includes a device ID of the first electronic device.

18. A method performed by an electronic device to add a video chat contact, comprising:
   obtaining a first list of email addresses from a social networking server;
   sending the first list of email addresses to a video chat server for comparison with a second list of email addresses stored on the video chat server, the second list of email addresses corresponding to other electronic devices that are video chat capable;
   sending information about the electronic device to the video chat server, the information configured for the video chat server to determine whether the electronic device is at least video chat capable;
   if the electronic device is at least video chat capable, receiving from the video chat server a third list of email addresses which is a subset of email addresses common to both the first list and the second list of email addresses; and
   automatically adding the third list of email addresses to a video chat contact list on the electronic device.

19. The method of claim 18, wherein the first list of email addresses is sent to the video chat server after logging into the electronic device.

20. A server configured to manage video chat contacts, the server configured to communicate with a first electronic device over a network, the server comprising memory storing computer executable instructions and a database, the database comprising a listing of email addresses, wherein the listing includes email addresses associated with other electronic devices having video chat capability, and the instructions comprising:
   receiving a request from the first electronic device to determine video chat capability associated with an email address, the email address corresponding to a second electronic device;
   receiving information from the first electronic device used by the server to determine whether the first electronic device is at least video chat capable;
   if the first electronic device is at least video chat capable, comparing the email address with the listing of email addresses; and
   after determining that an entry in the listing matches the email address, generating and returning a message to the first electronic device.

21. The server of claim 20 wherein the message is configured to invoke automatic addition of the email address as a video chat contact on the electronic device.

22. The server of claim 20 wherein the server only stores information related to the video chat contacts.

23. The server of claim 20 wherein each one of the email addresses is associated with a device ID, identifying a given electronic device of the other electronic devices.

24. The server of claim 23 wherein information about video hardware capability of the given electronic device is derived from the device ID.

25. The server of claim 20 wherein the server includes availability information stored in association with each one of the email addresses.

26. The server of claim 20 wherein the instructions further comprise, after receiving the request, determining if the first electronic device is also discoverable, which includes the first electronic device being video chat capable and subscribed to a video chat service.

27. The server of claim 20, wherein if it is determined the first electronic device is not video chat capable, the server taking no further action to add the email address as the video chat contact to the first electronic device.

28. The server of claim 20 wherein the instructions further comprise: after receiving the request, determining if the first electronic device is registered with the server, and if so, comparing the email address with the listing of email addresses.

29. The method of claim 20 wherein the instructions further comprise: after receiving the request, determining if the first electronic device is not registered with the server, and if not, the server sending an other message to the first electronic device prompting activation of video chat service.

30. The server of claim 29 wherein the instructions further comprise:
   after determining the first electronic device is not registered with the server, comparing the email address with the listing of email addresses; and,
   if an entry in the listing matches the email address, the other message further indicating that the email address is associated with a contact that is capable of video chat.

31. A first electronic device comprising:
   a camera;
   a display;
   a communication system;
   memory comprising executable instructions to add a video chat contact; and
   a processor, the processor configured to execute the instructions and configured to cause the first electronic device to at least:
   display a graphical user interface including an email address field on the display;
   receive an email address in the email address field, the email address corresponding to a second electronic device;
   send the email address and information about the first electronic device to a video chat server via the communication system, the information configured for the video chat server to determine whether the first electronic device is at least video chat capable;
   if the first electronic is at least video chat capable, receive a message generated from the video chat server indicating that the email address is associated with the second electronic device having video chat capability and, afterwards, automatically adding the email address to a video chat contact list on the first electronic device.

32. The first electronic device of claim 31 wherein, after receiving the message, the processor is configured to cause the electronic device to automatically populate a video chat address field in the graphical user interface with the email address.

33. The first electronic device of claim 31 wherein if the first electronic device is not registered with the video chat server, the first electronic device receives an other message prompting activation of video chat service.

34. The first electronic device of claim 33 wherein the other message includes an indication that the email address is associated with a contact that is capable of video chat.

35. The first electronic device of claim 31 wherein the processor is configured to further cause the first electronic device to at least:
   display an End User License Agreement (EULA) to activate a video chat service on the display;
   receiving an input accepting the EULA; and
   send a registration to the video chat server, including an email address of the first electronic device using the communication system.

36. The first electronic device of claim 31 wherein the information further includes a device ID of the first electronic device.

37. An electronic device comprising:
   a camera;
   a display;
   a communication system;
   memory comprising executable instructions to add a video chat contact; and
   a processor, the processor configured to execute the instructions and configured to cause the electronic device to at least:
   obtain a first list of email addresses from a social networking server;
   sending, using the communication system, the first list of email addresses to a video chat server for comparison with a second list of email addresses stored on the video chat server, the second list of email addresses corresponding to other electronic devices that are video chat capable;
   sending information about the electronic device to the video chat server, the information configured for the video chat server to determine whether the electronic device is at least video chat capable;
   if the electronic device is at least video chat capable, receiving from the video chat server a third list of email addresses which is a subset of email addresses common to both the first list and the second list of email addresses; and
   automatically adding the third list of email addresses to a video chat contact list stored in the memory.

38. The electronic device of claim 37, wherein the first list of email addresses is sent to the video chat server after logging into the electronic device.

39. A computer readable medium comprising executable instructions for a server to manage video chat contacts, the executable instructions comprising:
   receiving a request from a first electronic device to determine video chat capability associated with an email address, the email address corresponding to a second electronic device;
   receiving information from the first electronic device used by the server to determine whether the first electronic device is at least video chat capable;
   if the first electronic device is at least video chat capable, comparing the email address with a listing of email addresses, wherein the listing includes email addresses associated with other electronic devices having video chat capability; and
   after determining that an entry in the listing matches the email address, generating and returning a message to the first electronic device.

40. A computer readable medium comprising executable instructions for a first electronic device to add a video chat contact, the instructions comprising:
   displaying a graphical user interface including an email address field;
   receiving an email address in the email address field, the email address corresponding to a second electronic device;
   sending the email address and information about the first electronic device to a video chat server, the information configured for the video chat server to determine whether the first electronic device is at least video chat capable;
   if the first electronic is at least video chat capable, receiving a message generated from the video chat server indicating that the email address is associated with the second electronic device having video chat capability and, afterwards, automatically adding the email address to a video chat contact list on the first electronic device.

41. A computer readable medium comprising executable instructions for an electronic device to add a video chat contact, the instructions comprising:
- obtaining a first list of email addresses from a social networking server;
- sending the first list of email addresses to a video chat server for comparison with a second list of email addresses stored on the video chat server, the second list of email addresses corresponding to other electronic devices that are video chat capable;
- sending information about the electronic device to the video chat server, the information configured for the video chat server to determine whether the electronic device is at least video chat capable;
- if the electronic device is at least video chat capable, receiving from the video chat server a third list of email addresses which is a subset of email addresses common to both the first list and the second list of email addresses; and
- automatically adding the third list of email addresses to a video chat contact list on the electronic device.

* * * * *